United States Patent [19]
Siegrist

[11] Patent Number: 5,474,160
[45] Date of Patent: Dec. 12, 1995

[54] RING BRAKE AND CALIPER COOLED BY AIR FLOW

[76] Inventor: Eric Siegrist, R.R. #2, Wiarton, Ontario, Canada, N0H 2T0

[21] Appl. No.: 145,193

[22] Filed: Nov. 3, 1993

Related U.S. Application Data

[63] Continuation-in-part of Ser. No. 853,081, Mar. 17, 1992, Pat. No. 5,293,967, which is a continuation-in-part of Ser. No. 297,133, Jan. 17, 1989, Pat. No. 5,097,927.

[51] Int. Cl.⁶ .................................................. F16D 65/78
[52] U.S. Cl. ............................... 188/264 R; 188/218 A; 188/76
[58] Field of Search ................... 188/76, 218 R, 188/218 A, 264 R; 192/73, 113.2, 113.21, 113.23

[56] References Cited

U.S. PATENT DOCUMENTS

| | | | |
|---|---|---|---|
| 1,186,224 | 6/1916 | Murray | 118/218 R |
| 2,161,904 | 6/1939 | Sinclair | 188/218 R |
| 3,295,636 | 1/1967 | Adams | 188/76 X |
| 3,853,207 | 12/1974 | Rist | 188/76 |
| 4,577,733 | 3/1986 | Oguro et al. | 188/217 |
| 4,705,093 | 11/1987 | Ogino | 188/73.31 X |
| 5,293,967 | 3/1994 | Siegrist | 188/264 R |

FOREIGN PATENT DOCUMENTS 5212 of 1895 United Kingdom ..................... 192/73

*Primary Examiner*—Robert J. Oberleitner
*Assistant Examiner*—Kevin D. Rutherford

[57] ABSTRACT

The present invention relates to ring brake arrangements and in particular to an effective arrangement for cooling of the brake. Heat is effectively rendered from the ring braking member by a fanned hub support arrangement which transfers the heat energy to an axial air flow which is pumped through the center of the brake. In addition heat is transferred to the brake caliper support bracket from the brake caliper. The brake caliper support bracket is located across the air flow which serves to cool the same. This structure is particularly well suited for high brake demand requirements where heat build up causes problems or reduces braking efficiency. The brake can also be used or can assist brake for trucks where the brake is located on the drive shaft.

17 Claims, 19 Drawing Sheets

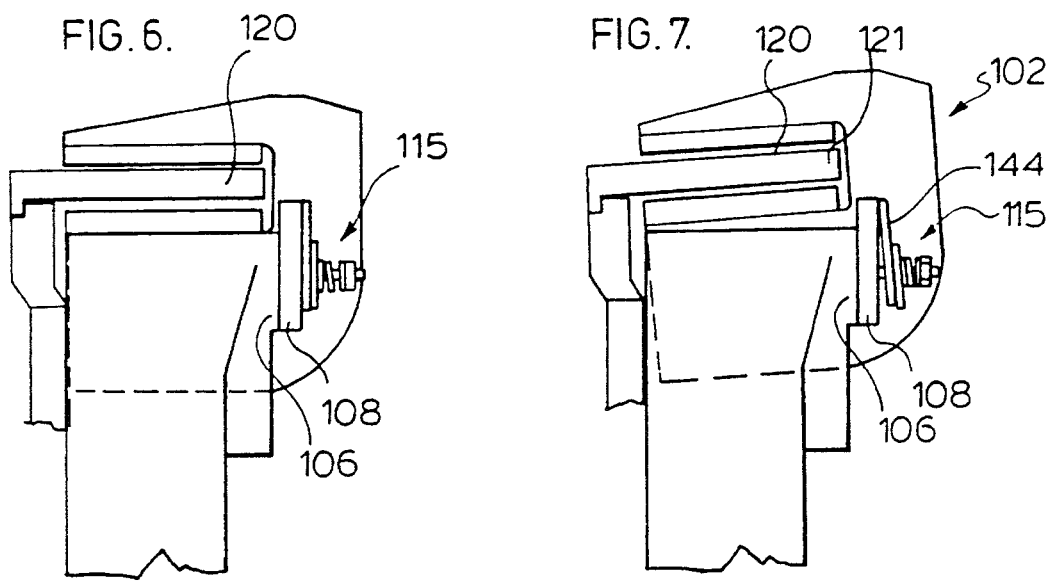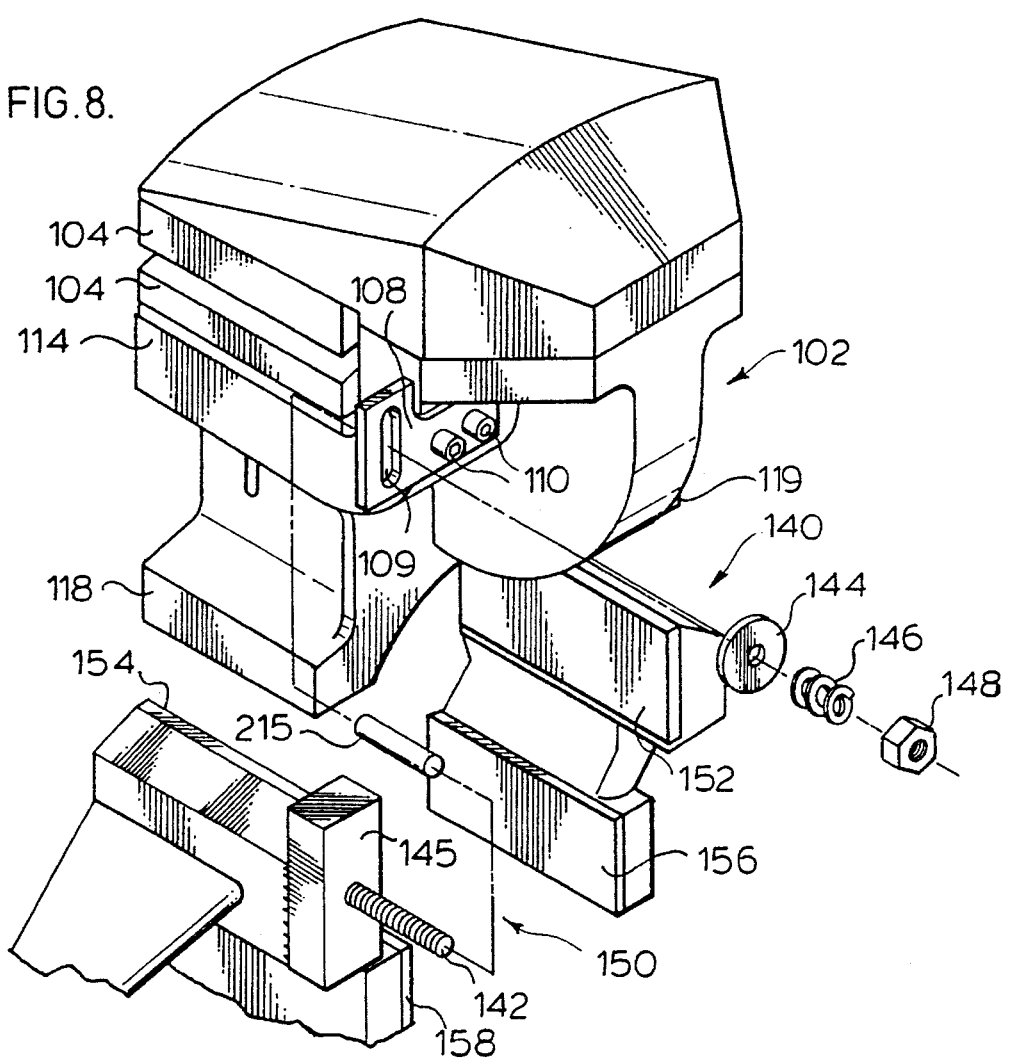

RING BRAKE AND CALIPER COOLED BY AIR FLOW

FIELD OF THE INVENTION

This a continuation-in-part of application Ser. No. 07/853,081 filed Mar. 17, 1992, now U.S. Pat. No. 5,293,967, which is a continuation-in-part of application Ser. No. 07/297,133 filed Jan. 17, 1989, now U.S. Pat. No. 5,097,927.

BACKGROUND OF THE INVENTION

Disk brakes for automobiles have proven highly popular and a number of these disk brakes do include some sort of internal air cooling in an effort to remove heat from the braking system. With any friction brake arrangement, there is a build-up of heat and the brake must dissipate this energy to the surrounding environment. This problem becomes more acute in race car applications or higher load applications such as trucks or trains in that there is less opportunity to dissipate this energy to the surrounding environment between braking applications.

To overcome a number of these problems, there are various high temperature materials which are used for the brake pads and the actual braking surfaces can also be of a high temperature material. Unfortunately, some of these materials are susceptible to damage such as warping which can easily occur if sufficient water strikes these surfaces when they are hot. There is a real problem associated with brakes which do not effectively transfer energy to the environment at a sufficiently high rate. A low rate of heat transfer leads to high brake temperatures which can substantially reduce performance, typically referred to as brake fade or, in more extreme cases, brake failure. The problems are not limited to merely the braking surfaces per se, as the energy does travel through surrounding components and can reach the wheel bearings causing other temperature problems such as melting of the grease and/or premature failure of bearings. Most bearings have an upper temperature range much lower than the temperatures for race car brakes. Furthermore, the hydraulic fluid used to actuate the brake pads and various hydraulic components thereof also have a maximum temperature limit much less than the maximum temperature of the braking surfaces.

Drum type brakes do not generate as much heat as disk brakes, however, they are generally not being as efficient as disk brakes. Furthermore a number of arrangements have been proposed which use a ring brake having pads at either sides of the ring braking member. Such ring brakes have the capability of providing a large braking surface at a substantial distance from the axis of rotation whereby a large braking force can be generated. This implies that a high heat load will be generated under high brake load conditions. Problems occur in trying to dissipate this heat load, particularly under repetitive braking applications.

The present invention seeks to provide a ring brake system which effectively dissipates heat from the ring braking member, the ring brake pads and the brake caliper arrangement.

SUMMARY OF THE INVENTION

The present invention provides a particular structure for a ring braking member which when rotated causes an axial air flow to move from one side of the brake to the other side of the brake through the center of the brake. Rotation of the system produces a pumping action to encourage this air flow. The heat or energy generated during actuation of the brake is initially absorbed by the ring braking member and the brake pads. Heat is subsequently transferred from the ring braking member to a fan hub and to radial members of the fan hub which are located in the air flow. The radial members pump the air through the brake. These radial members in addition to pumping the air provide effective energy transfer areas in contact with the air flow. Furthermore, the radial members serve to isolate the wheel bearings from the high temperatures that can occur at the braking surface and, to a lesser extent, at the ends of the radial members adjacent the braking surface. The braking pads are also very hot under high load applications and this energy is conducted into the brake caliper which supports the brake pads. The brake caliper transfers by conduction a large portion of the heat energy to a brake caliper support bracket which is placed across the air flow. This brake caliper support bracket is designed to act as a heat sink, removing energy from the brake pads and caliper and is designed to efficiently transfer energy to the air flow as it flows through and around the brake caliper support bracket.

In a preferred embodiment the interior braking surface is also protected from the air flow by a shield arrangement, preferably by a flanged type arrangement attached to the brake caliper structure to protect the interior braking surface from contaminants (water, dirt, oil) in the air flow. In addition, the interior surface can radiate energy to the flange which is positioned a short distance from the braking surface to thereby further increase the rate of energy dissipation to the air flow passing through the caliper and over the shield arrangement.

According to an aspect of the invention the caliper and the fan hub are of cast aluminum which generally has a high coefficient of thermal conduction. In this way the structures can serve to quickly dissipate the heat energy throughout its structure and the entire structure can then effectively transfer the heat to the air flow. Each of these components can be designed to have a substantial area in contact with the air flow and generally aligned therewith to encourage heat transfer therebetween. It has been found with this arrangement that in most cases, the components may be made of aluminum alloys and a high rate of energy transfer to the air flow can be realized. In the brake arrangement large brake pads are used, and these pads provide a high braking force and also provide a large surface to remove heat from ring braking member and braking pads which is transferred to the caliper. These large surfaces also act to remove heat from the ring braking member as the braking pads, even in a release position, are fairly close to the interior and exterior braking surfaces (depending upon the exact temperatures the ring brake can, on occasion, serve to extract heat from the pads).

BRIEF DESCRIPTION OF THE DRAWINGS

Preferred embodiments of the invention are shown in the drawings, wherein:

FIGS. 6 and 7 are side views showing the caliper retained in a modified mounting bracket;

FIG. 8 is a partial perspective view of the brake caliper and its coordination with the modified mounting bracket;

DETAILED DESCRIPTION OF THE PREFERRED EMBODIMENTS

Figure 1:
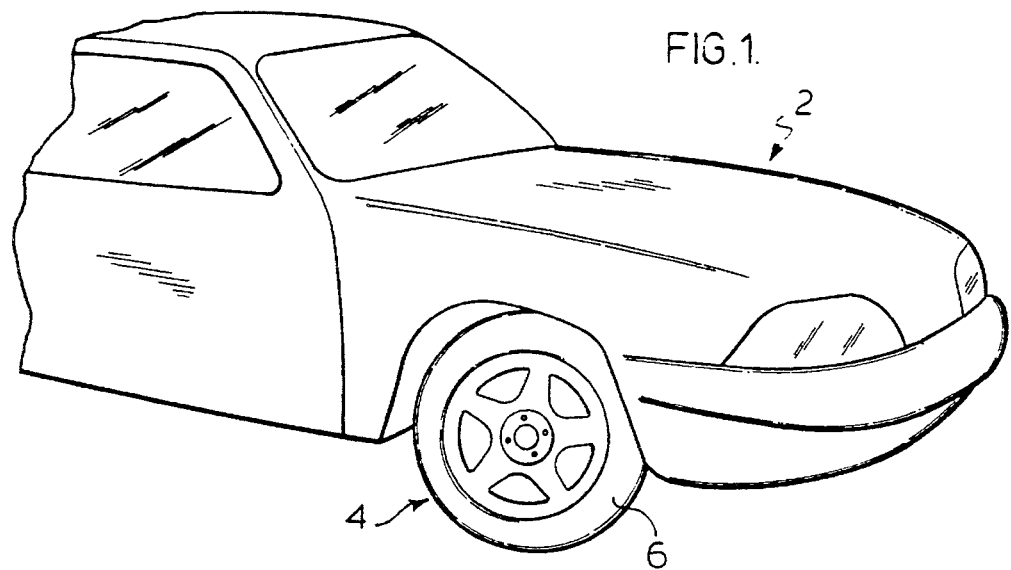
FIG. 1 is a partial perspective view of a car.
Figure 2:
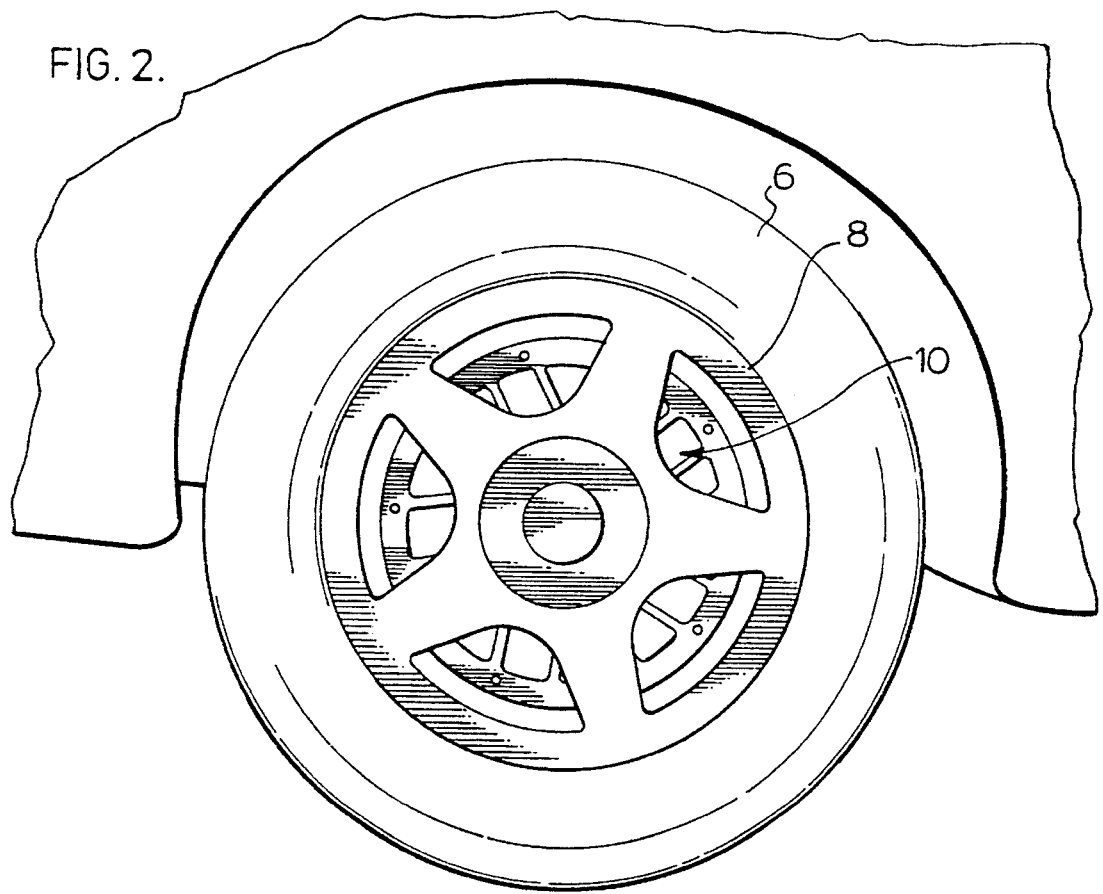
FIG. 2 is partial perspective view of a wheel of a car having the improved fanned hub wheel braking system.

The car 2 as shown is supported by a wheel 4 and tire 6. The brake arrangement is driven by the wheel 4. As shown in FIG. 2 a fan or air pump arrangement 10 rotates with the wheel and causes an axial air flow from the interior of the brake to the exterior of the wheel. If desired a reverse flow could be used.

Figure 3:
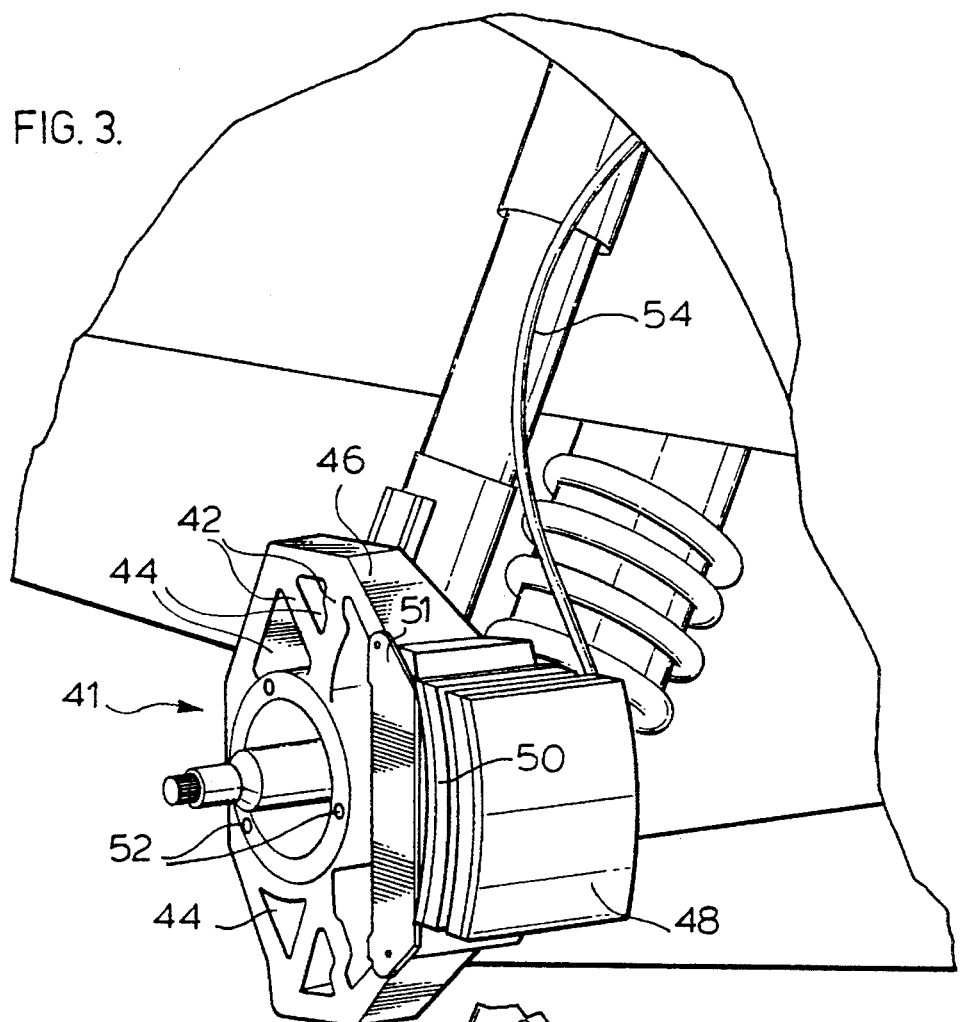
FIG. 3 is a partial perspective view showing the brake caliper arrangement and brake pads associated with the wheel spindle.
Figure 4:
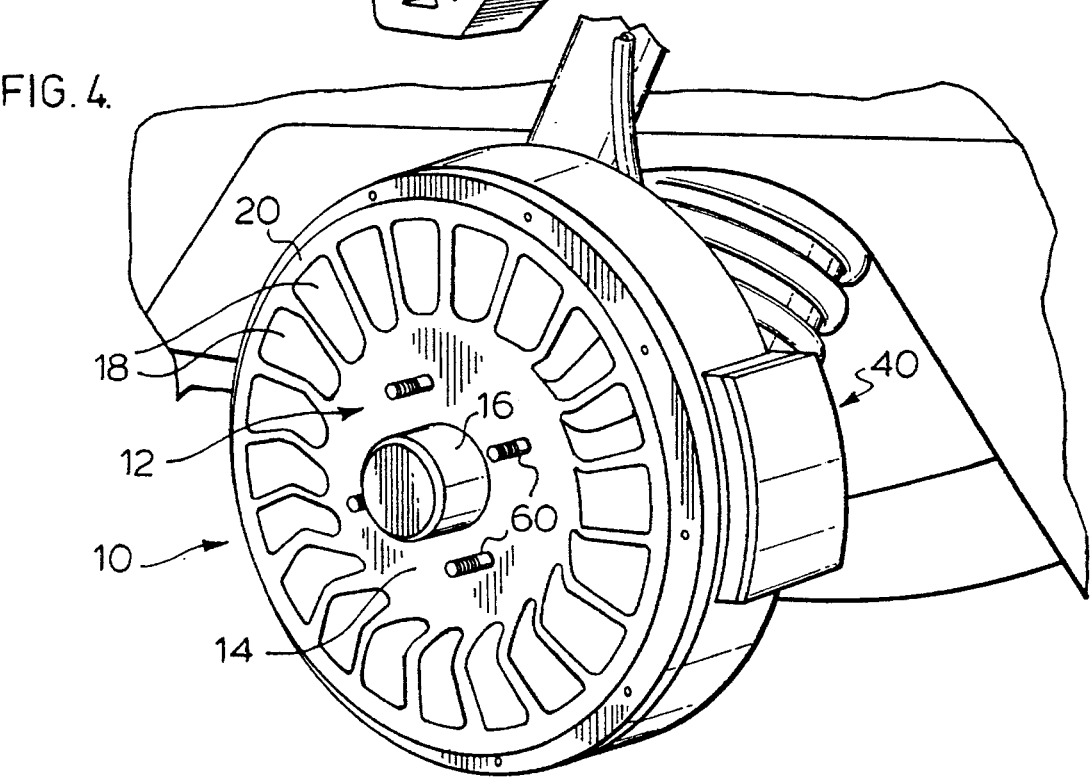
FIG. 4 is a partial perspective view showing the fan hub and ring brake member in an operating relationship on the wheel spindle.
Figure 5:
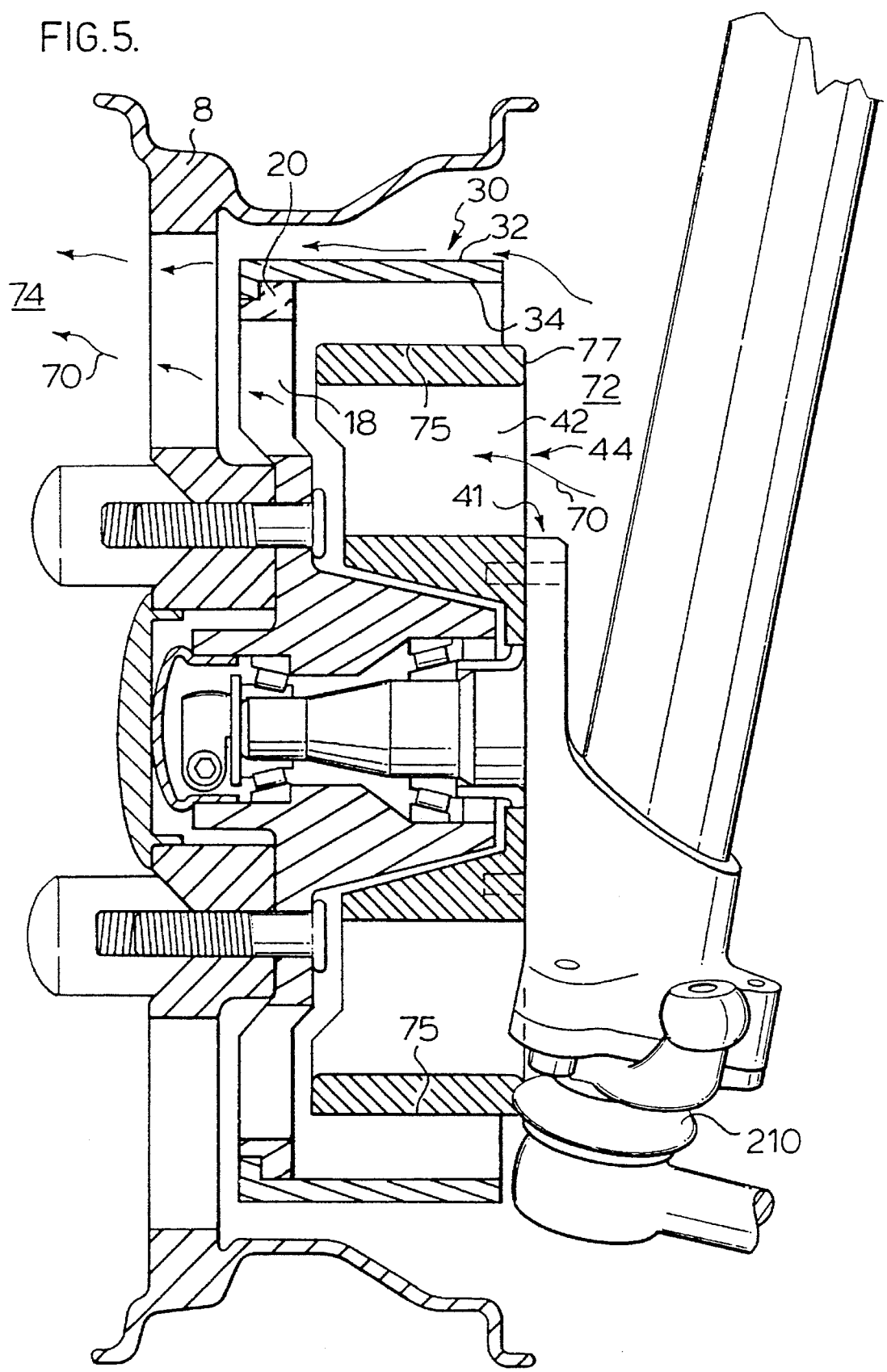
FIG. 5 is a sectional view through the braking arrangement and is associated with wheel hub that is secured to the braking arrangement.
Figure 9:
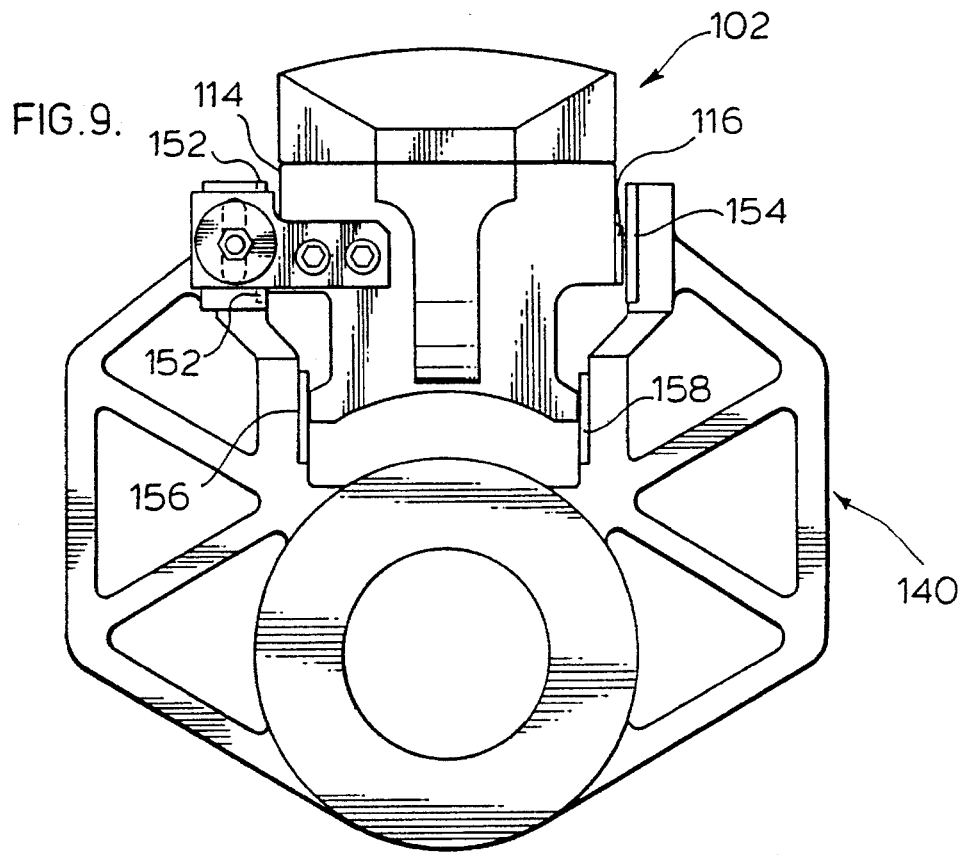
FIG. 9 is a side view of the mounting bracket and brake caliper.
Figure 10:
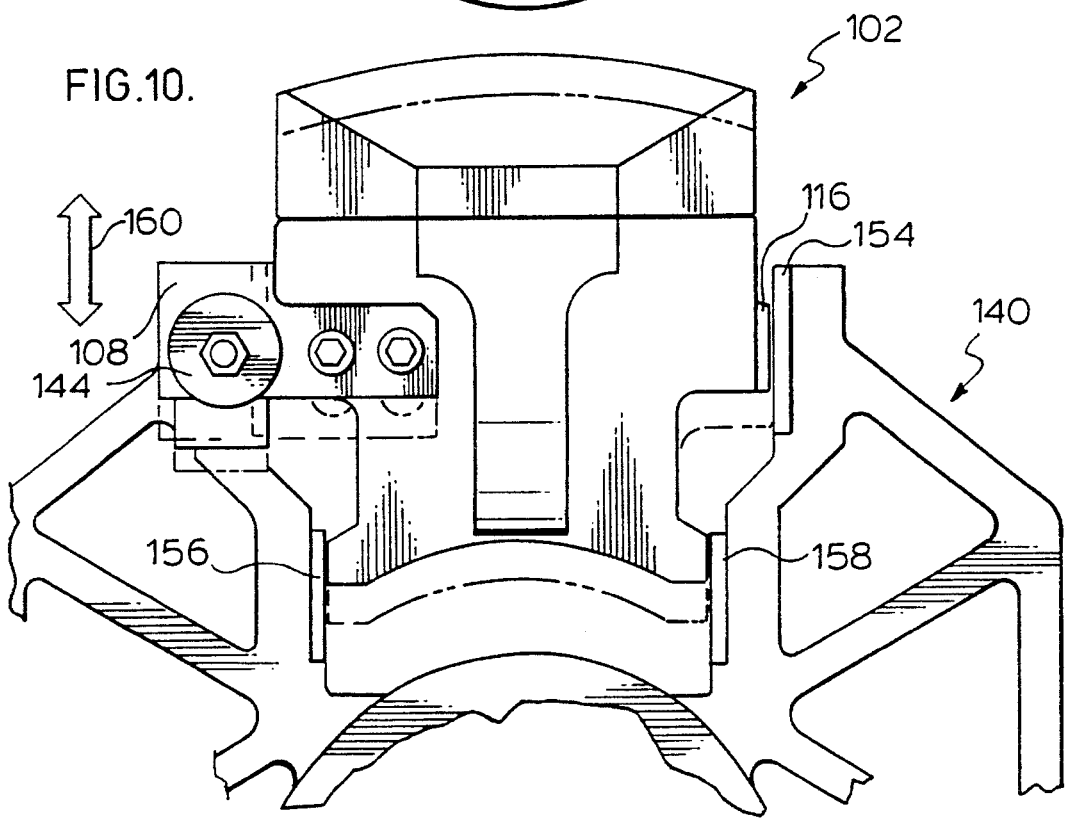
FIG. 10 is a partial side view of the mounting bracket and caliper showing movement of the brake caliper within the mounting bracket.

Additional details of the brake system are shown in FIGS. 3 through 5. The fan or air pump arrangement 10 includes a fan wheel generally shown as 12 has a central area 14 which among other things supports the bearing hub 16. Exterior to the bearing hub 16 are the radially disposed radial members 18 which are interconnected at an outer edge by the joining ring 20. The radially disposed radial members 18 when the fan wheel 12 is rotated about the bearing hub 16 cause an axial air flow from one side of the fan wheel to the other. The joining ring 20 is isolated from the bearing hub 16 by the radial members 18. These radial members are generally shaped to interact with the air flow and have a large surface area in contact with the air flow for transferring heat energy to the air flow as it moves across the radial members.

A ring braking member 30 is mechanically fastened to the joining ring 20 of the fan wheel and is in good thermal transfer relationship with the joining ring 20. In this way the fan wheel 12 acts as a heat sink for the ring brake member 30 and this energy is dissipated throughout the fan wheel 12. Fortunately the fan wheel when rotated allows a large amount of this energy to be dissipated to the air flow as it passes over the radial member 18. In this way the central area 14 and the bearing hub 16 remain protected from the high temperatures of the ring brake and are substantially cooler than the joining ring 20. Furthermore this temperature differential continues to draw heat away from the braking ring member 30.

The braking ring member 30 has an exterior braking surface 32 and an interior braking surface 34. The exterior braking surface does not have any tendency to accumulate dirt or material thereon as it is essentially thrown off with rotation of the braking ring member. In contrast the interior braking surface can trap material and a number of holes have been provided between the exterior braking surface and the interior braking surface.

A brake caliper 40 supports and positions the interior brake pad 50 and the exterior brake pad 48 to oppose sides of the ring braking member. The caliper 40 is received in and supported by the brake caliper support bracket 41. The caliper 40 is trapped within bracket 41 by plates 51 located to opposite sides of the bracket. The brake pads can be fairly large as generally indicated. The brake caliper support bracket 41 is mechanically fastened to the support structure of the vehicle preferably via the mechanical fastening points indicated as 52 in FIG. 3. The brake caliper support bracket 41 includes a number of support arms 42 having ports 44 there through which are generally aligned with the air flow which passes through a central part of the brakes. Again these ports 44 have a large surface area over which the air flow passes to accommodate a high rate of energy transfer to the air flow.

It has been found that the brake pads 48 and 50 transfer a great deal of heat energy to the brake caliper 40 and brake caliper support bracket 41. These components are designed to be located in the axial air flow within a large surface area for effective transfer of energy to the air flow. The truss like structure of the support bracket 41 by which collectively defined as a number of ports large surface area contacting the air flow.

Actuation of the brake pads is accomplished preferably hydraulically and hydraulic fluid may be provided to the brake actuator within the caliper via line 54. The wheel 8 is secured to the fan wheel 12 via the wheel bolts 60. In this way, the wheel rotates the fan wheel 12 radial members 18 to encourage an air flow 70 indicated in FIG. 5 through the brake. Thus, it can be seen that air to the interior of the brake is pumped through the center of the brake to the exterior. The interior part of the brake is generally indicated as 72 and the exterior or outside portion is indicated as 74. As can be seen the support arms 42 of the brake caliper support bracket 41 has a large surface that is in contact with the air flow 70. The ports 44 restrict passage of the air flow through the center of the brakes and as very little of this air flow will contact the interior braking surface. Thus the bracket 41 also acts as a shield protecting the interior braking surface from contaminants (water and/or dirt) in the air flow. It can be appreciated that the braking member 30 is extremely hot and will try to transfer heat energy to the fan wheel 12 via the joining ring 20. This heat path is encouraged with this design to get the heat energy to the radial members 18 which are designed to transfer the energy to the axial air flow. Typically the braking ring member 30 is mechanically fastened to the joining ring 20 and there is a good thermal energy conducting relationship therebetween. The system is designed to encourage heat energy transfer to the joining ring 20 and to the radial members 18. This heat energy is transferred into the fan wheel as the whole fan wheel is acting as a heat sink. However, the air flow serves to remove much of this heat energy.

It has been found with the system as described above that the brake caliper arrangement acts as a good heat sink and can effectively transfer heat energy to the air flow. The design and placement of the caliper arrangement in the air flow with a large surface area component over which the air flow must pass results in a high rate of energy transfer. Similarly there is excellent contact between the radial members 18 and the air flow and heat energy from the ring braking member 30 is effectively transferred to this air flow.

It can also be seen that the brake caliper arrangement has an outer surface 75 generally parallel with and in close proximity to the interior braking surfaces 34. Heat energy can be radiated from the interior brake surface 34 to this exterior surface 75. This exterior surface 75 also serves to isolate the axial air flow from the interior braking surface 34. For clarity, it has not been shown, but an additional flange can be provided on the brake caliper arrangement such that the radial members 18 do not encourage an air flow between the interior surface 34 and surface 75 or substantially no air flow therebetween. The point is that the air flow can have contaminants particularly water and dirt and it may be preferable to more fully protect this interior surface if necessary. A blocking flange at the end 77 of the caliper overlapping the space from the ring braking member 30 can serve this purpose.

The heat shield can also include a heat shield for mechanical components, particularly lubricated mechanical components, such as the ball joint 210 shown in FIG. 5. This component is in close proximity to the heated surfaces of the brake system and may require protection to reduce thermal radiation from these hot surfaces. As can be appreciated, the present brake system dissipates energy to the air flow, however, this air flow is dependent upon rotation of the wheel. On occasion, heavy braking, which will generate a large thermal load, can be followed by a low rotation rate of the wheel and low axial air flow or even a stationary condition and no axial air flow. Under such conditions, the brake components can become quite hot and radiate energy to adjacent components. A thermal shield can reduce the amount of energy radiated in this manner and protect such components.

It has been found with this braking arrangement that a great deal of braking force can be provided and the heat energy resulting from braking can be dissipated to the air flow which passes from one side of the brake through the center of the brake to the other side of the brake. Depending upon the particular application, and the normal running speed of the fan hub it is possible to match the rate of energy distribution or transfer to the air flow versus the expected rate of heat energy generation due to braking. The point with the present invention is that an air flow through the braking system is utilized to allow heat energy generated at the braking surface and at the braking pads to be dissipated. This provides a further degree of design variability to meet the demands of particular applications.

The present brake has been described with respect to braking the wheel of a vehicle. However, it can also apply as a brake for a rotating drive shaft or other rotating shaft. In such alternate applications the shielding capability may not be as critical due to the particular environment in which the shaft is found. Such a brake has particular application for transmission brakes or drive shaft brakes for trucks.

It has also been found that the fan wheel 12 maintains the bearings that are in contact with the wheel spindle as shown in FIG. 5 at a satisfactory temperature and much lower than temperatures that are common with disk braking system where much of the heat energy eventually is accumulated in the bearing hub 16. Therefore, not only do the radial members 18 encourage the air flow and provide an effective surface for transferring heat energy but they also serve to isolate to a large extent the bearings on the wheel spindle from the very hot temperatures generated at the braking surface 30.

With the present system, even in a demanding race environment where brakes are used more frequently and on a more demanding basis, the brake and the braking surfaces have a lower operating temperature, several hundred degrees below those of comparable disk brake systems. According to tests in a race car application, the temperature of the ring brake generally topped out between 500°–700° F. This temperature range was several hundred degrees lower than with existing disk brake systems. Furthermore, the disc brake system continued to build due to the fact that the system could not dissipate the energy at a fast enough rate. If the rate of heat generation is greater than the rate of heat dissipation the difference in the energy is accumulated in the braking system and depending upon the difference between these two rates the temperature of the brake can become very high. Problems of this type are reduced with the present system where a high rate of energy dissipation is realized.

A modified brake caliper and mounting bracket are shown in FIGS. 6 through 11. The mounting bracket 140 is basically 'C' shaped and is open either side thereof to allow compensation for thermal expansion. Thus, there is an open central cavity, generally shown as 150, in which the brake caliper 102 is located and generally floats. The caliper 102 floats in that it moves within the mounting bracket when the opposed brake pads 104 are brought into braking engagement with the rotating ring braking member 120.

The brake caliper 102 is maintained in the mounting bracket 140 by a retaining arrangement, generally indicated as 115. This includes a mounting plate 108 secured by retaining bolts 110 to the brake caliper, with this mounting plate having a retaining slot 109. The retaining slot 109 is sleeved over bolt 142 which projects from the mounting bracket 140. The mounting plate 108 is retained on the mounting bracket 140 by the cooperating washer 144, spring 146 and retaining nut 148. The mounting bracket 108 is slidable on the planar surface 145 provided on the mounting bracket 140.

A sleeve 215 of predetermined length is shown in FIG. 8 and acts as a stop position for the washer 144 and retaining nut 148. Use of sleeve 215 predetermines the force exerted by spring 146 and simplifies installation. Sleeves of different lengths can be used if different spring forces are desired. In some applications, the sleeve may be eliminated.

The brake, when operated in a generally cold condition, is indicated in FIG. 6. As can be seen, the brake caliper 102 is generally centered on the ring brake member 120, positioning the brake pads 104 either side of the ring braking member. The retaining arrangement 115 has allowed sufficient movement of the brake caliper to allow this cleared position to be assumed. Application of the brake pads to engage ring brake member 120 is accomplished by means of a hydraulic piston arrangement located within the brake caliper 102 which urges the interior brake pad 104 towards the exterior brake pad. Any required movement of the brake caliper 102 within the mounting bracket 140 is allowed by the retaining arrangement 115.

During severe braking conditions or multiple braking conditions, the ring braking member 120 can become very hot and there is a tendency for this member to bell mouth somewhat at its free end 121. The retaining arrangement 115, as shown in FIG. 7, allows the brake caliper 102 to accommodate this bell mouth occurrence, as the brake caliper can move out of the vertical plane of the mounting bracket 140. Thus, a tilting type action can occur. It has also been found with this arrangement that there can be sufficient pull back of the brake pads, such that, in the release position, there will be sufficient clearance between the ring brake member 120 and the free end 121. The structure in FIG. 7 has been exaggerated to illustrate the operation of the components.

The brake caliper 102, as shown in FIG. 8, is preferably a cast aluminum and has upper guide surfaces 114 and 116 and lower guide surfaces 118 and 119. Surfaces 114 and 116 cooperate with the upper wear plates 152 and 154 and the lower guide surfaces 118 and 119 cooperate with lower wear plates 156 and 158 of the mounting bracket. As can be appreciated, when the brake pads are in an operating position and engaging the ring brake member 120, there is a tendency for the caliper to be forced to a downstream side of the mounting bracket 140. Furthermore, the brake pads are forced to this downstream side and strike the wear plate 152. These brake pads typically have a metal backing plate 153 and the edge of this engages the wear plate 152. This can result in substantial loads and wear, and therefore, wear plate 152 is preferably stainless steel or other suitable high wearing material.

The wear plates 154, 158 and 152, 156 cooperate with the brake caliper to maintain the position of the brake caliper and to minimize wear while maintaining the free floating relationship of the brake caliper within the mounting bracket. The free floating arrangement must accommodate the interaction in a radial type direction of the mounting bracket 140, as indicated by the arrow 160 in FIG. 10. To increase heat transfer from the caliper to the bracket, wear plates 154, 156 and 158 may be brass.

Figure 11:
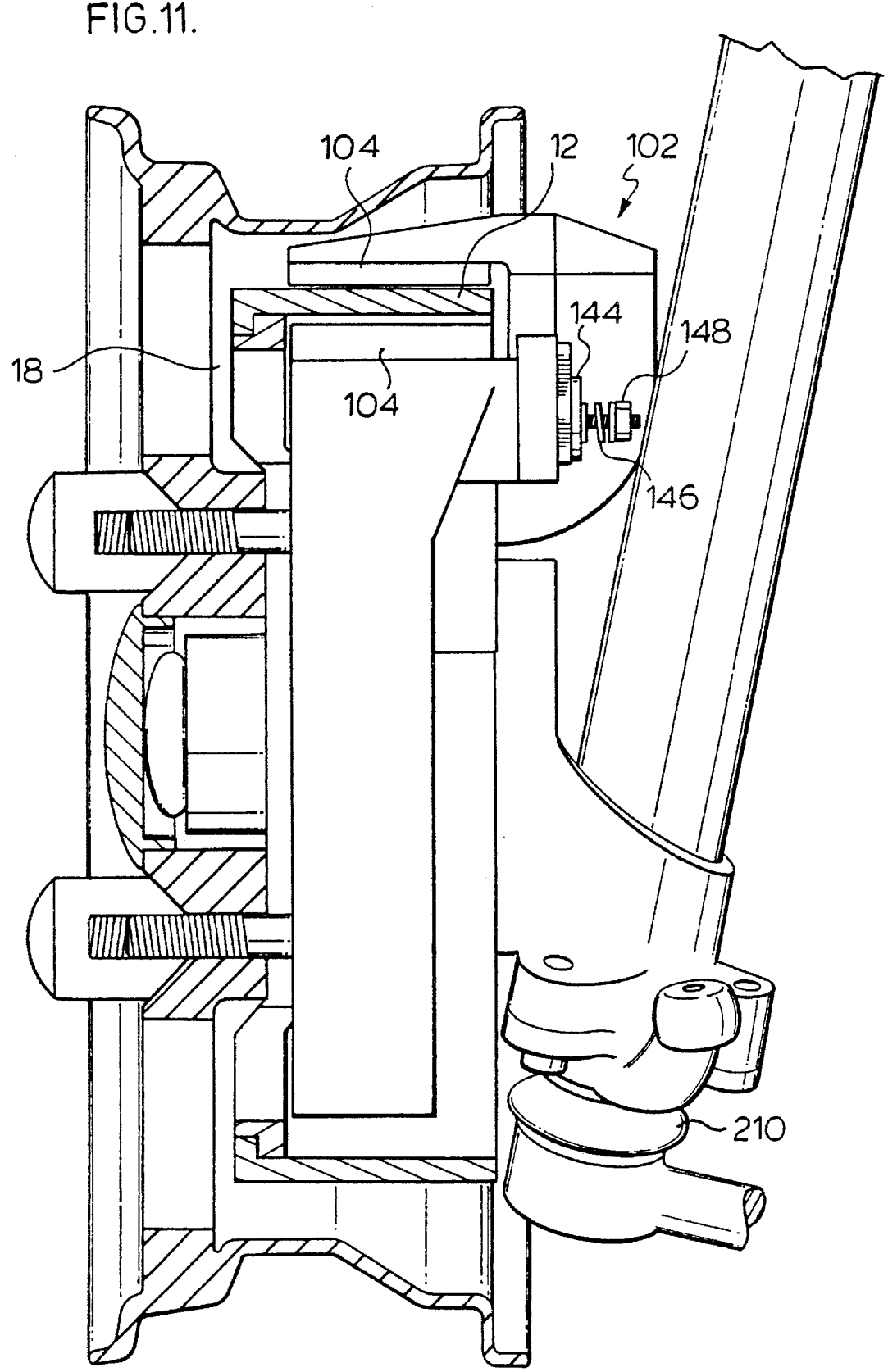
FIG. 11 is a sectional view showing the mounting arrangement wheel hub.

The brake caliper 102, when secured within the modified mounting bracket 140 by the retaining arrangement 115, provides a very simple arrangement which can easily be removed. The assembled system is shown in FIG. 11 and it can be appreciated that release of the retaining arrangement allows the caliper to be removed and any service can be easily carried out.

As discussed, the wear plates are preferably stainless steel or brass. The wear plates are selected to provide an effective heat transfer path as well as to address the particular wear requirements. This effective heat transfer path allows heat from the brake caliper 102 to pass into the mounting bracket 140, which essentially works as a heat sink for the brake caliper. Air continues to flow through the mounting bracket 140 thereby dissipating heat from the mounting bracket to the air flow.

Figure 12:
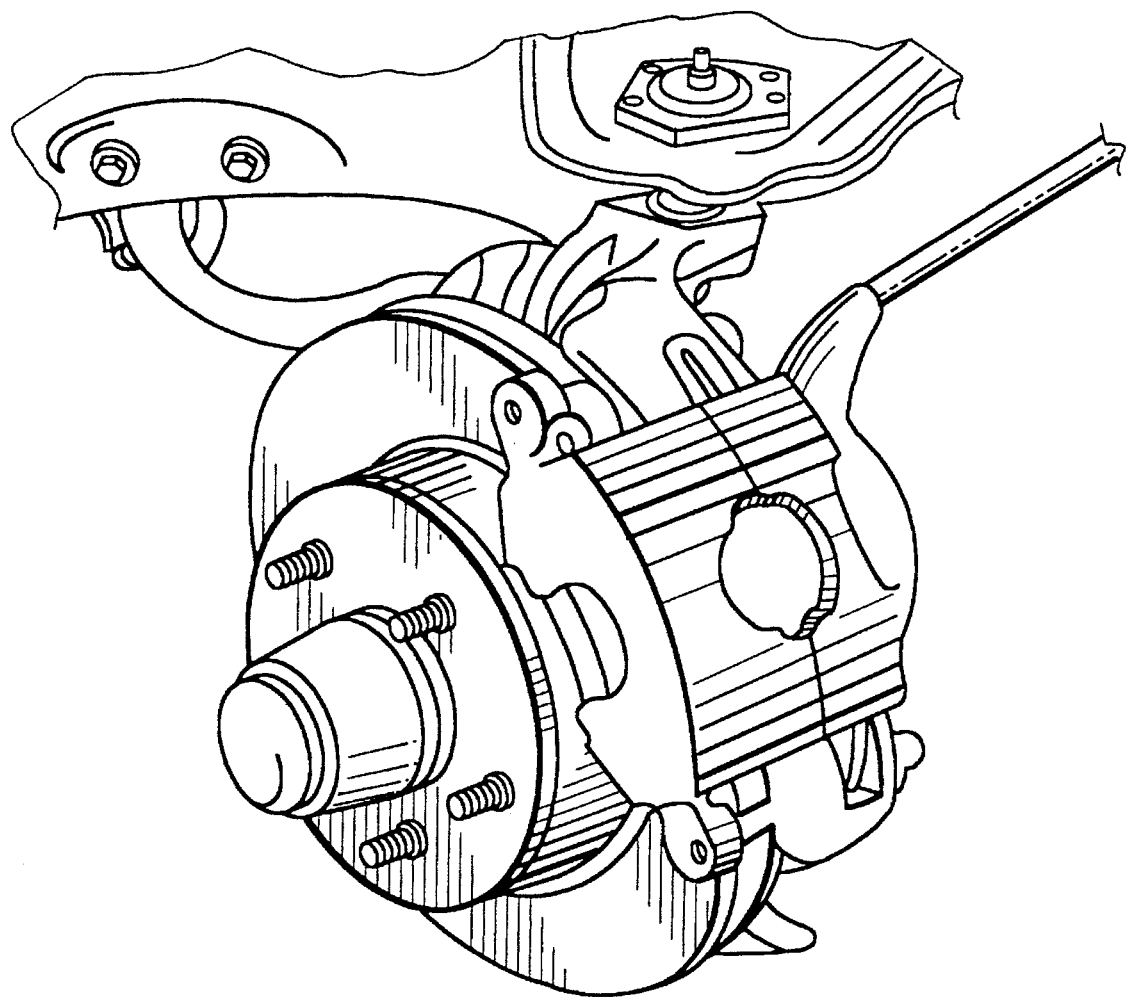
FIGS. 12 and 13 show various temperatures at selected points in a disk braking system (prior art) and a ring braking system of the present invention.
Figure 13:
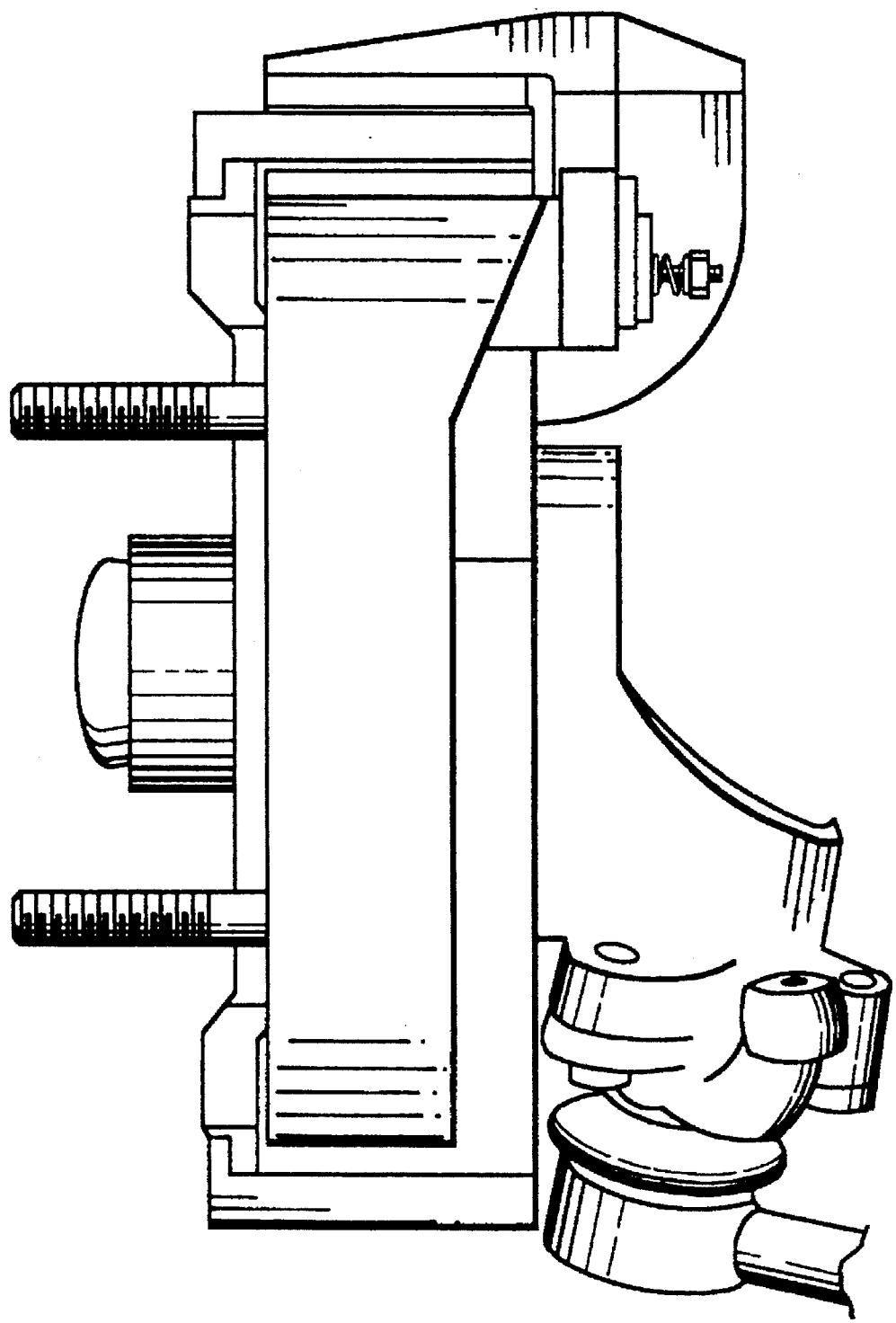

FIG. 12 shows a ventilated disc brake arrangement which is used on a high performance Ford Mustang™, and FIG. 13 shows a ring brake, in accordance with the invention, which can be used on the same Ford Mustang.

Various tests were carried out on these brakes by modifying a lathe arrangement to turn the disc or the ring brake of the respective structures while applying a braking force to the braking member. It was generally found that the disc arrangement became unstable at a lower braking force than the ring braking member. A measurement of the braking force was made by attaching a torque arm to the brake caliper structure, which is held in place by a hydraulic cylinder arrangement. The pressure of the cylinder was then used to measure the force, and based on the torque arm, a measurement of brake horsepower was made. The disc arrangement remained at the edge of stability at approximately 7 brake horsepower for a continuous application. In contrast, the ring brake arrangement shown in FIG. 13 was continuously run at approximately 9 brake horsepower, while maintaining stability. Stability was mostly measured as a function of the variation in the fluid pressure. At a certain point, the brake would become quite unstable, indicated by widely changing fluid pressure, and each system was backed off to a point where the fluid pressure was more constant.

Various temperatures were measured on the apparatus of FIGS. 12 and 13 to measure the ability of each system to dissipate the energy. With the ventilated disc brake of FIG. 12, a substantial heat build-up in the hub occurred, indicated by the area having a maximum temperature of approximately 400° F. and a minimum temperature of about 370° F. The disc adjacent an inside edge operated between 600° F. and 700° F., whereas the outer extreme of the brake operated between 800° F. and 850° F. In addition, pad temperatures were measured by a probe, located where indicated in FIG. 12. The caliper temperature was measured to provide an assessment of any heat build-up in the caliper. Application of the brake causes the temperature of the rotating member to rise as well as a temperature increase in the components in thermal conduction therewith. In addition, the brake caliper absorbs heat energy.

FIG. 13 indicates the maximum and minimum temperature range of various components of the ring brake system. In this case, the temperature is very hot adjacent the free edge of the ring brake, indicated as an average temperature of 850° F. to 895° F. The heat flows through the ring brake member to the fan blades, which had an average temperature of 260° F. to 280° F. Note, the substantial temperature drop across the surface of the ring brake. The inner edge of the ring brake member, for example, had a temperature of 630° F. to 700° F. It should also be noted that the center hub, which would be the wheel bearings, had an average temperature of 180° F. to 220° F. This arrangement was also used to measure the bracket temperature at the general location indicated as well as a caliper temperature probe and a brake pad temperature probe. Various charts of these temperatures are provided as FIGS. 15 through 34.

Figure 14:
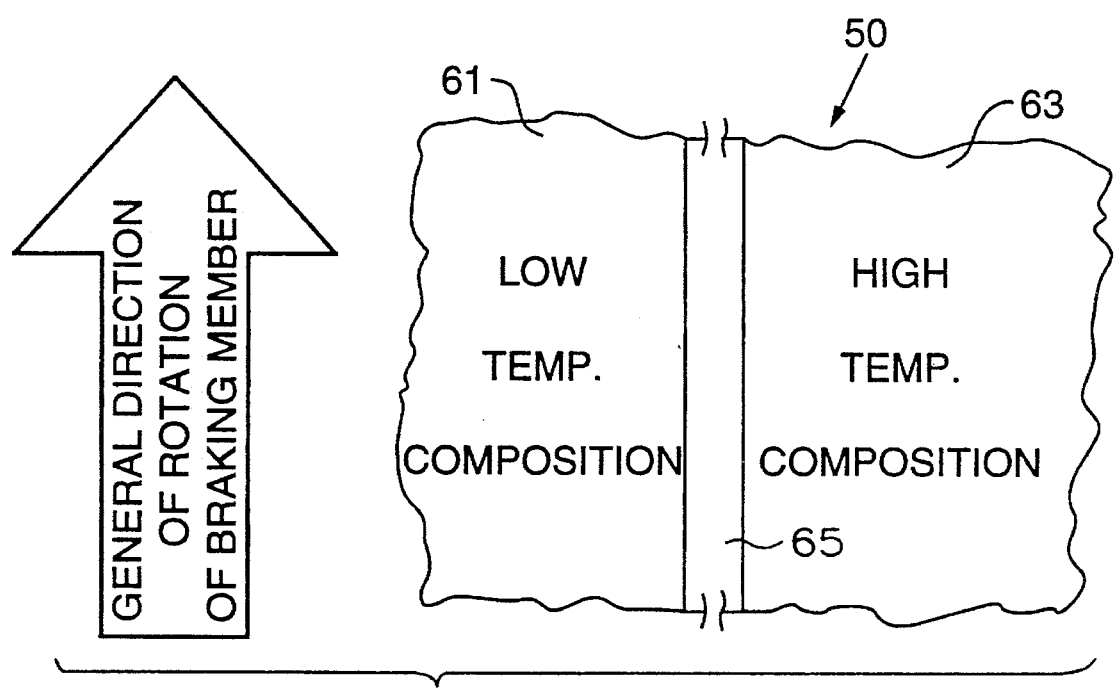
FIG. 14 is a top view schematic of a two composition brake pad.
Figure 15:
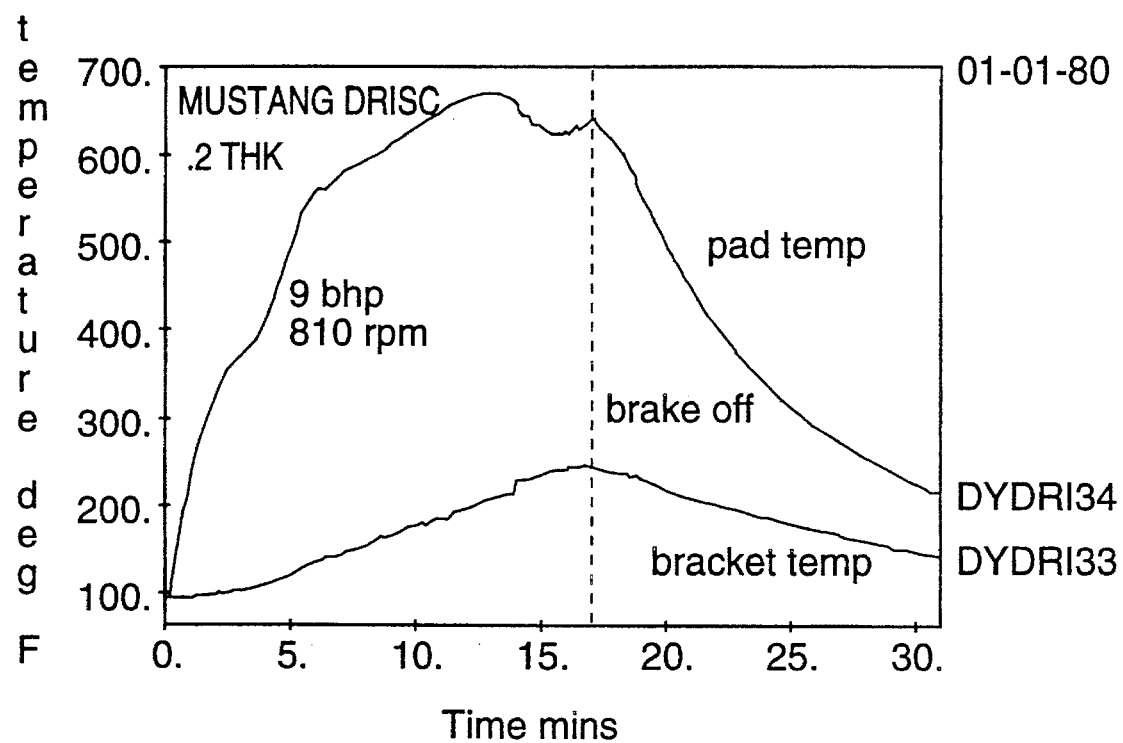
FIGS. 15 through 34 show comparison of various performance criteria of a disc and brake system and the present brake system.
Figure 16:
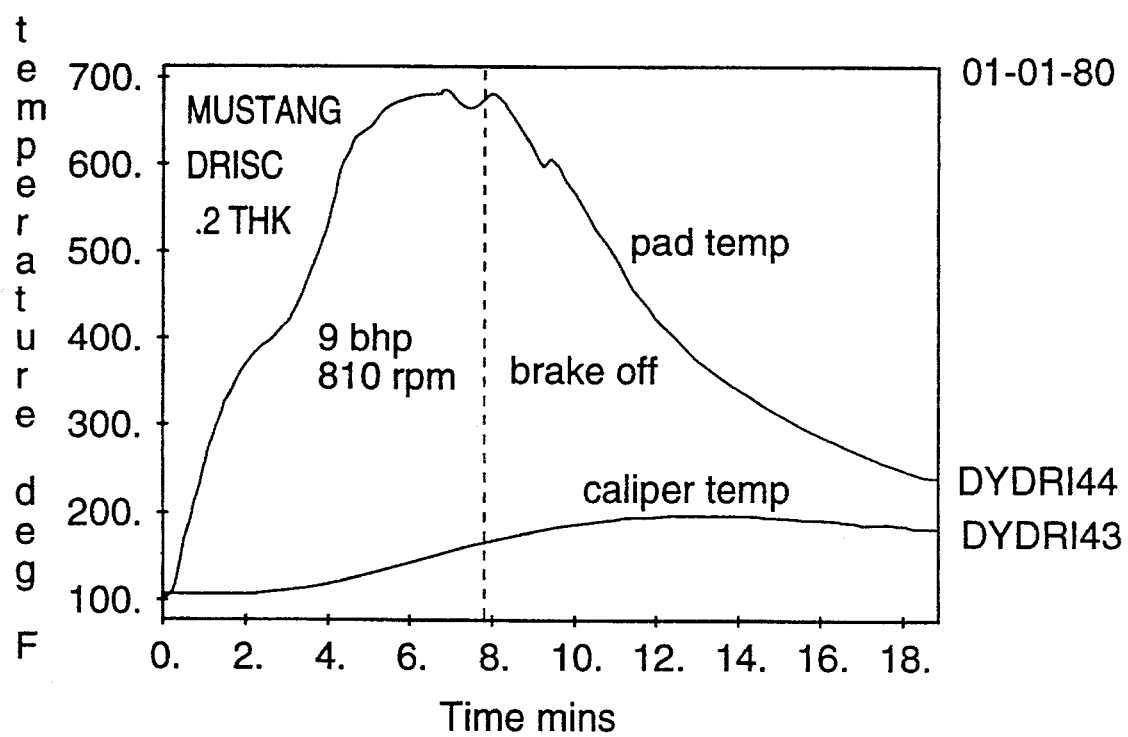
Figure 17:
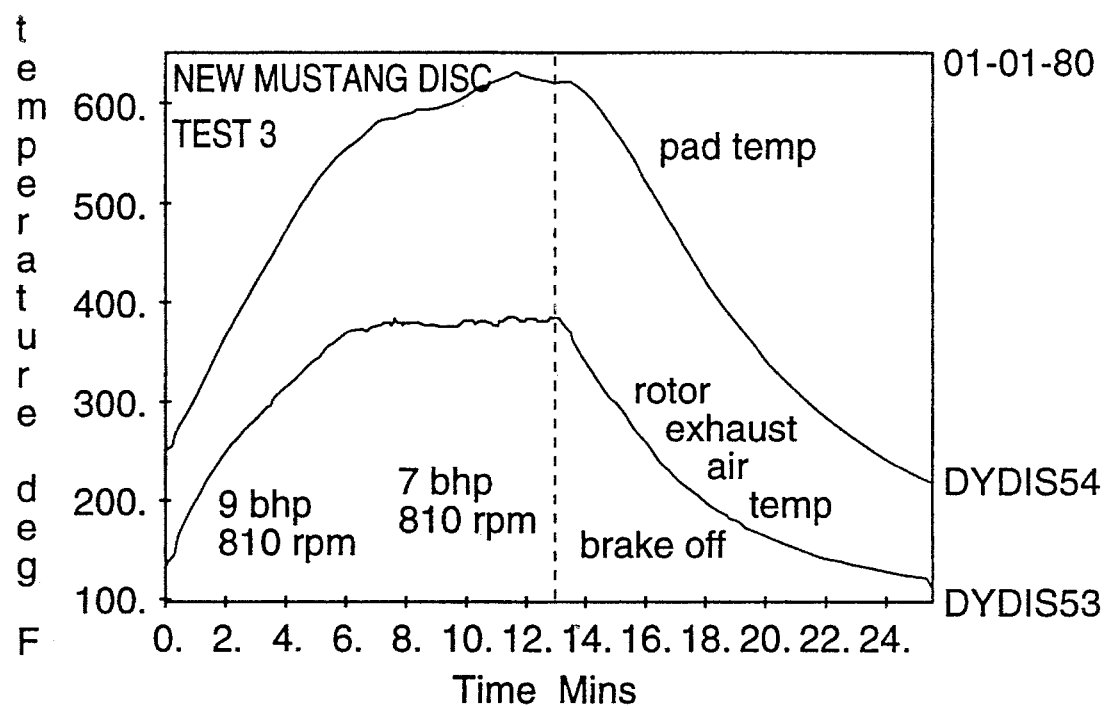
Figure 18:
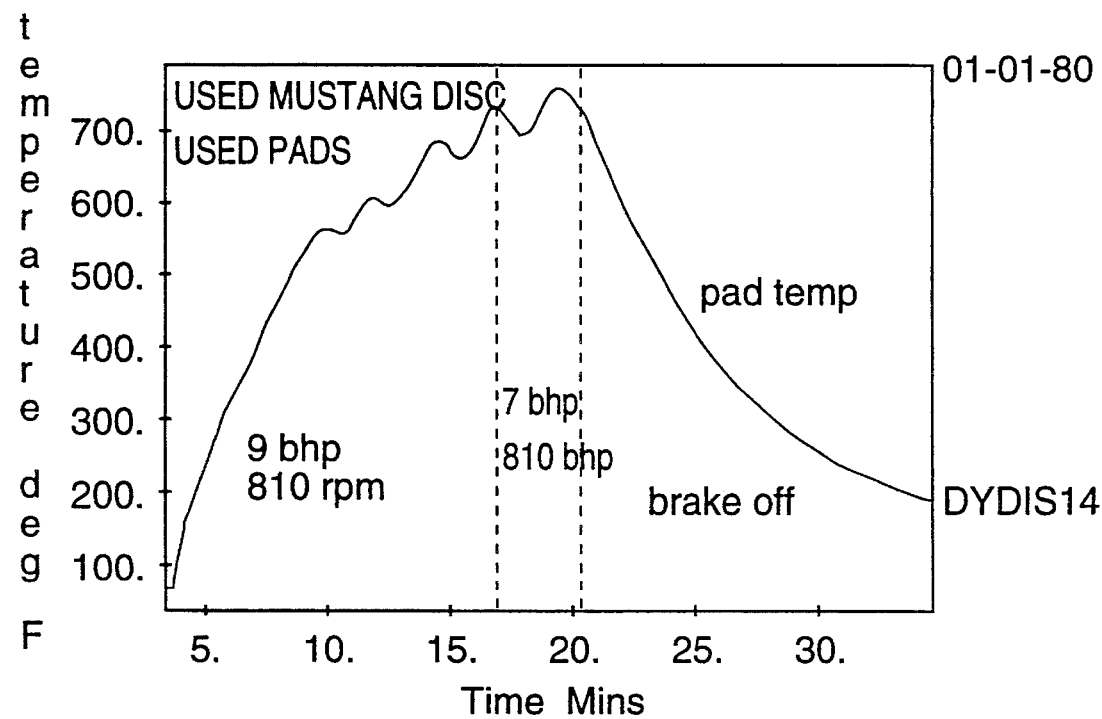
Figure 19:
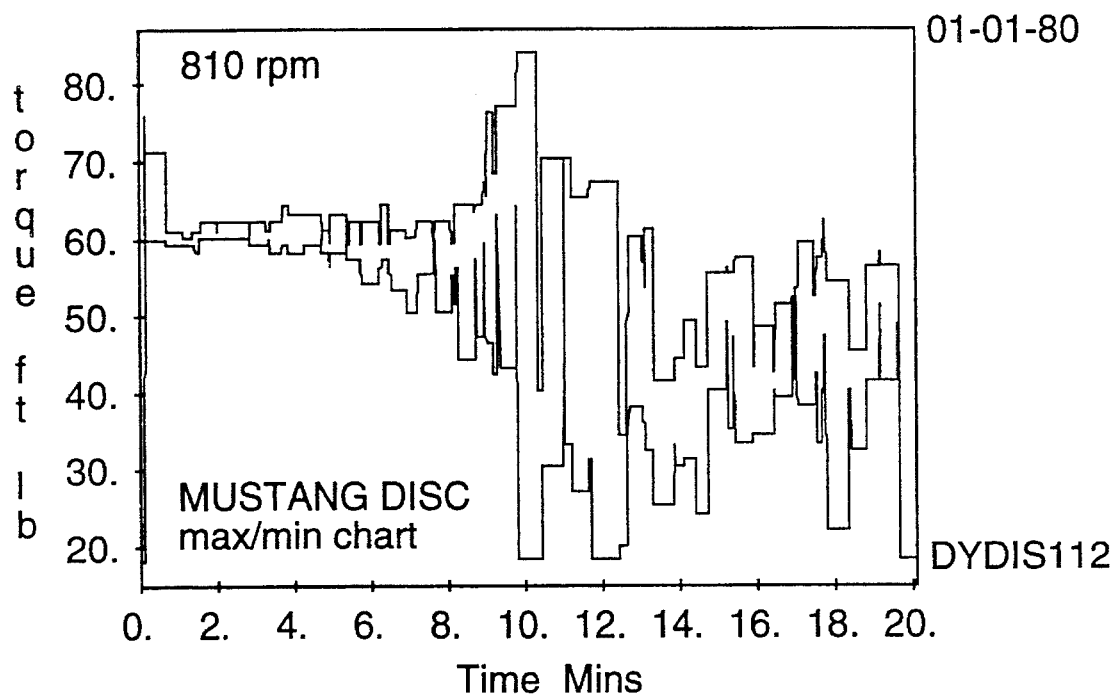
Figure 20:
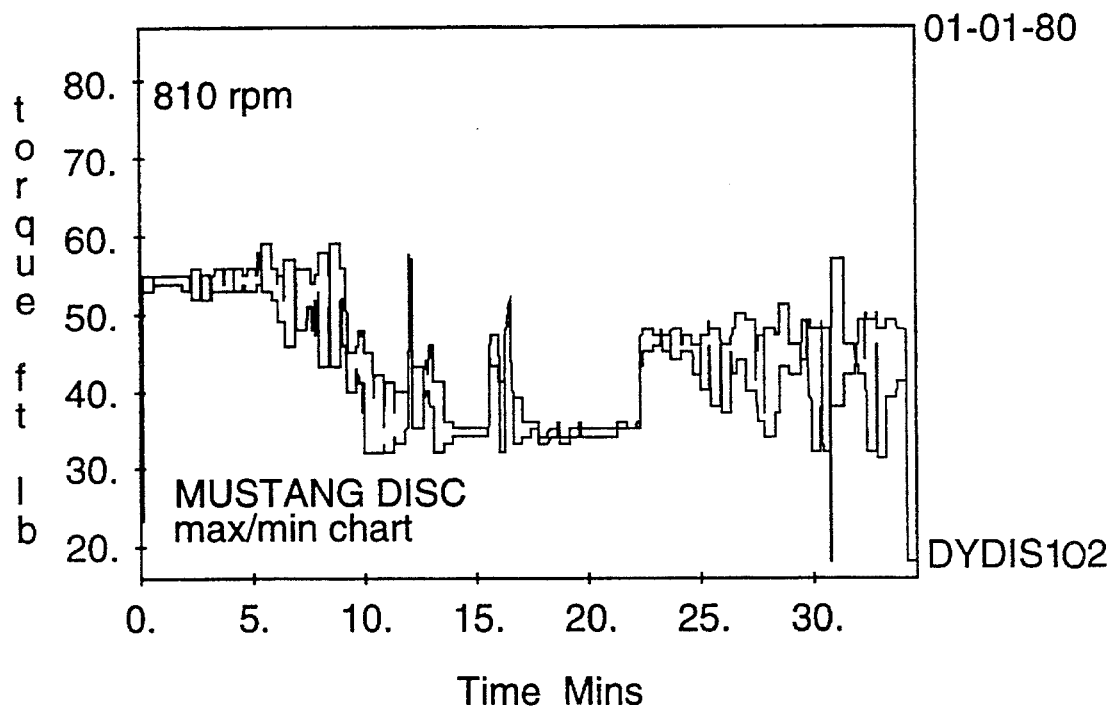
Figure 21:
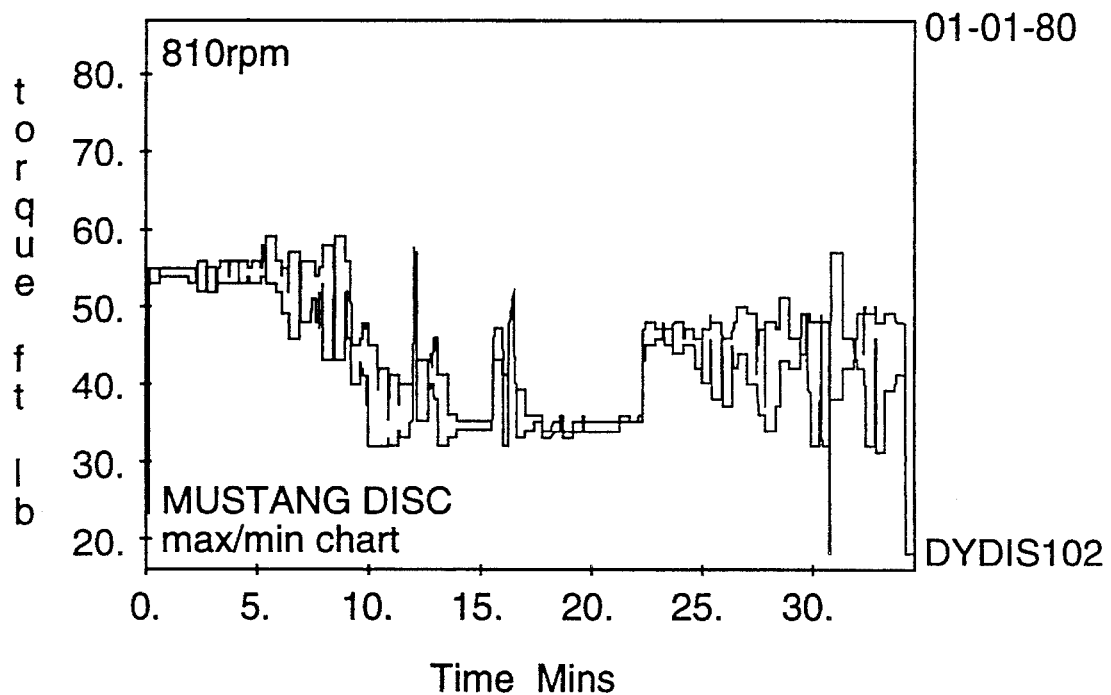
Figure 22:
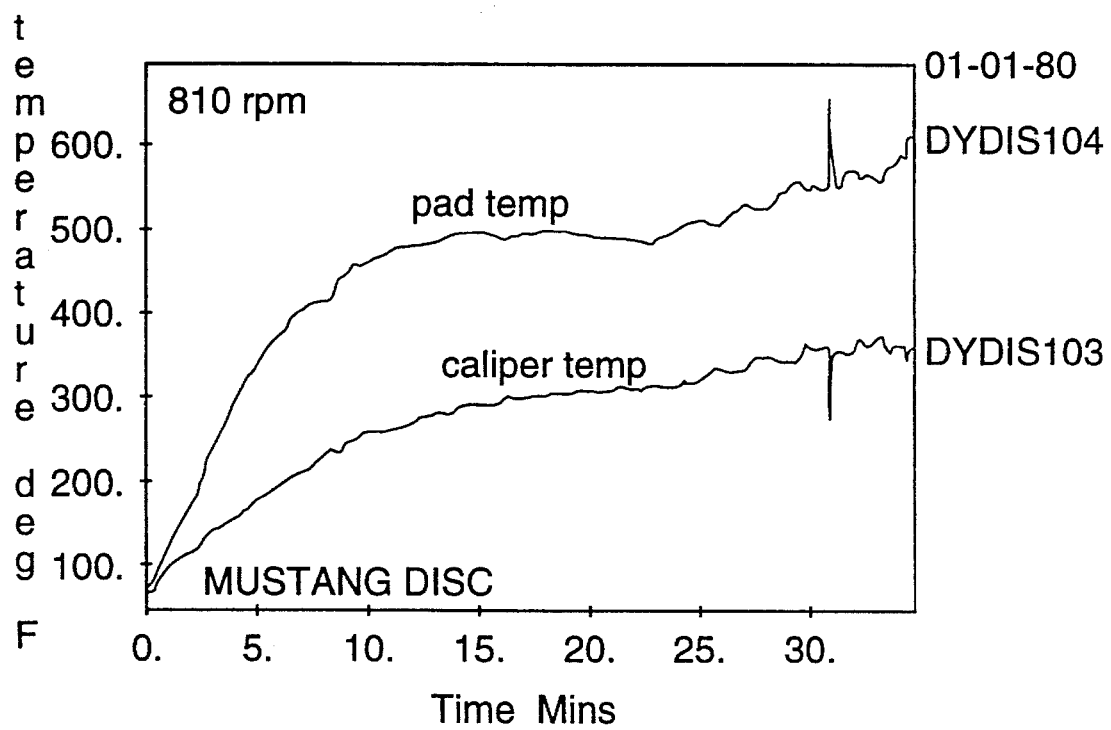
Figure 23:
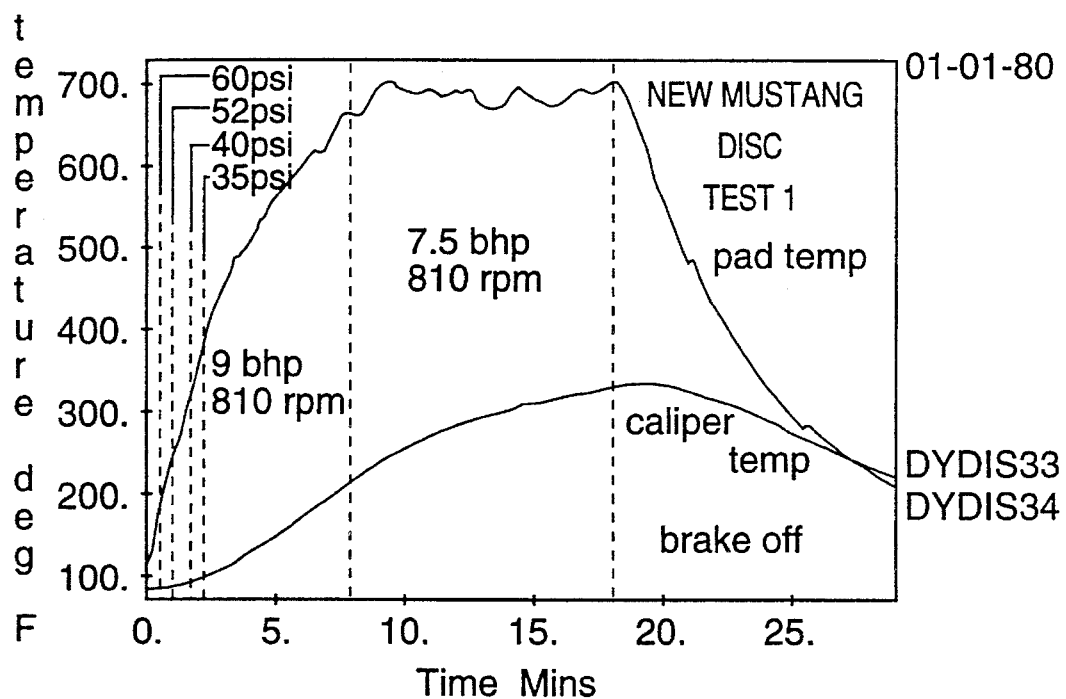
Figure 24:
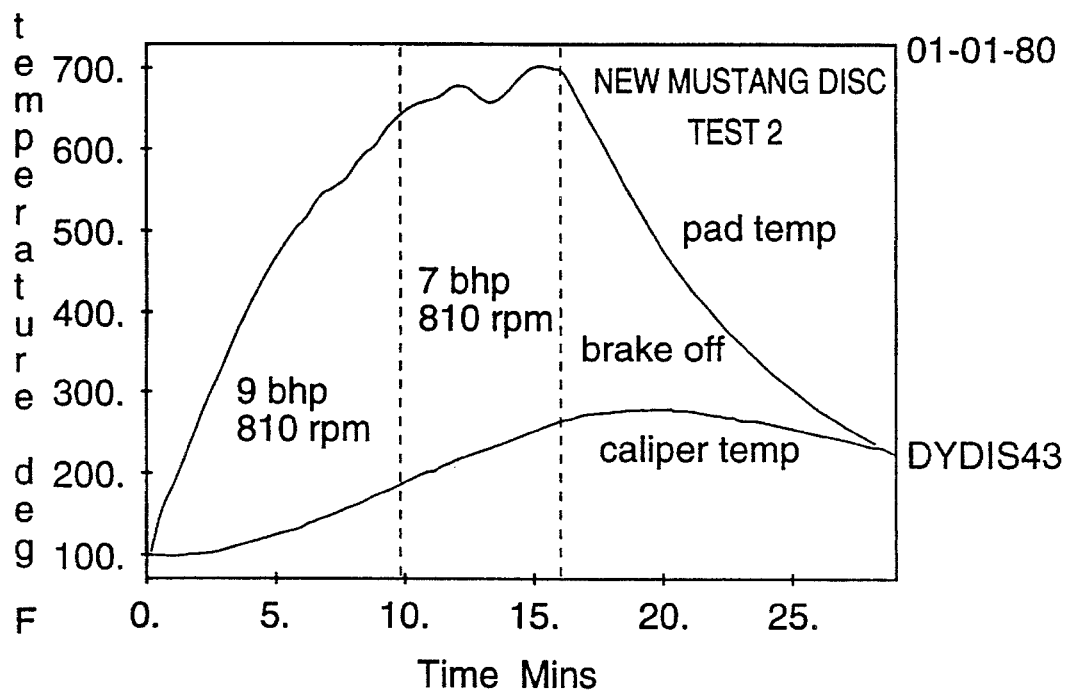
Figure 25:
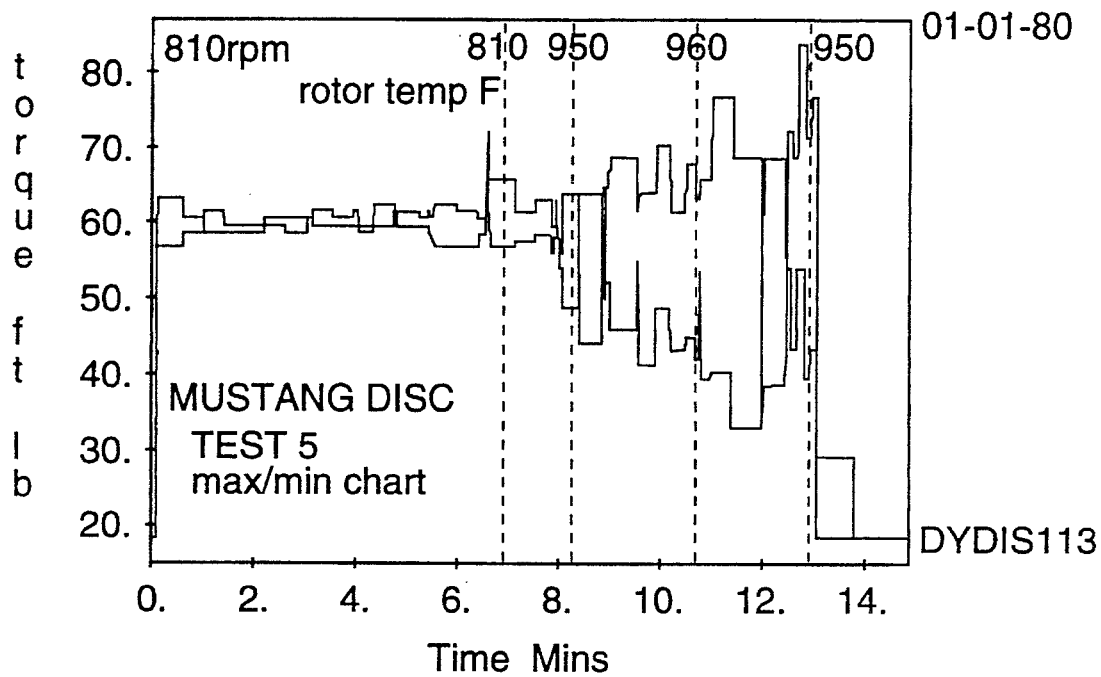
Figure 26:
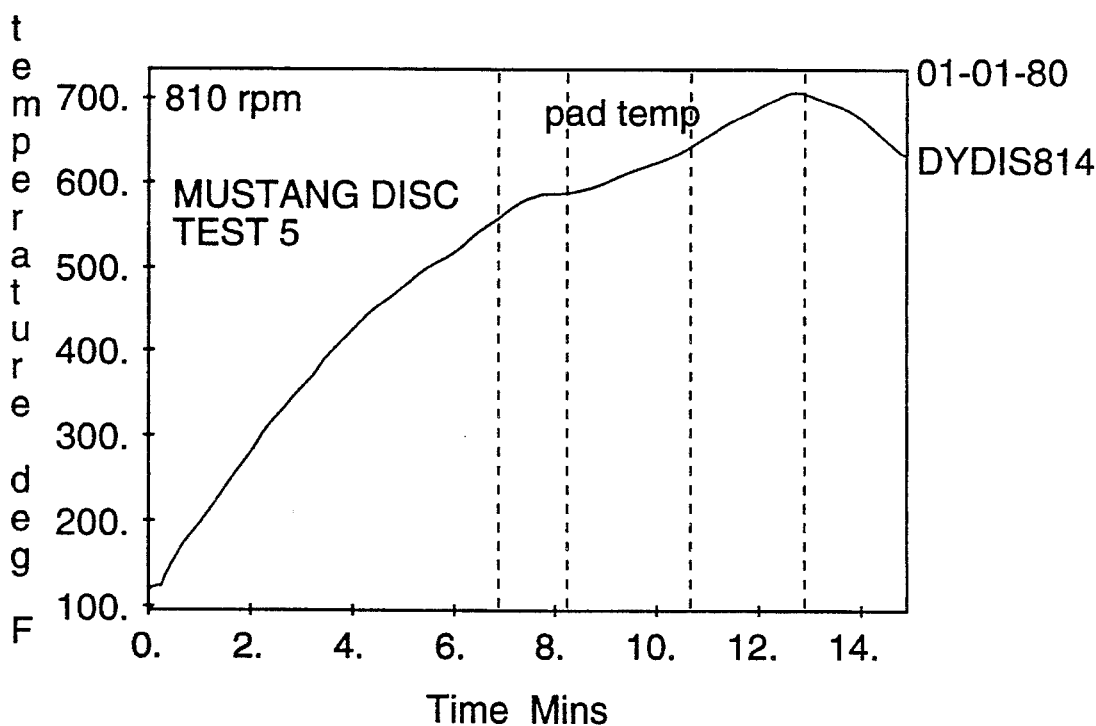
Figure 27:
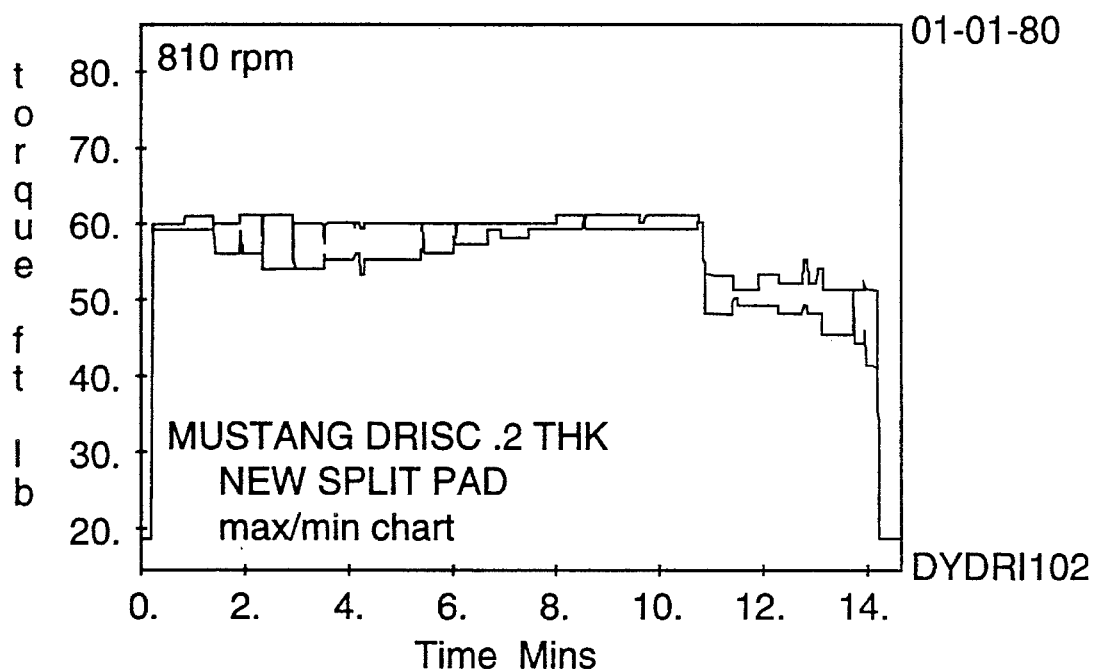
Figure 28:
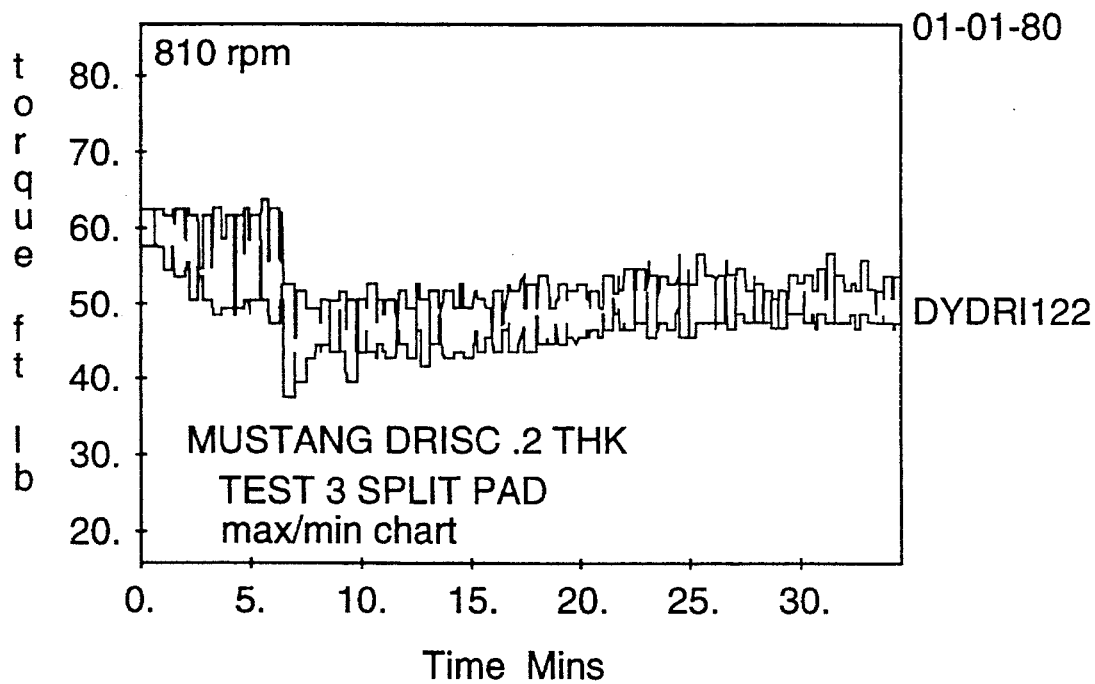
Figure 29:
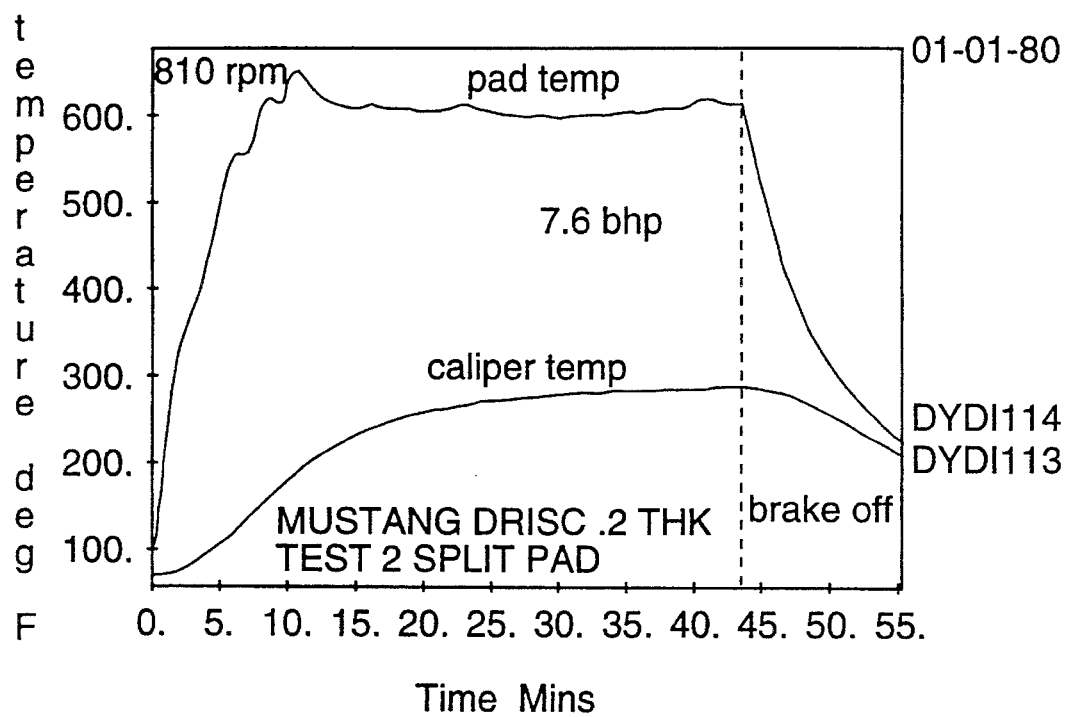
Figure 30:
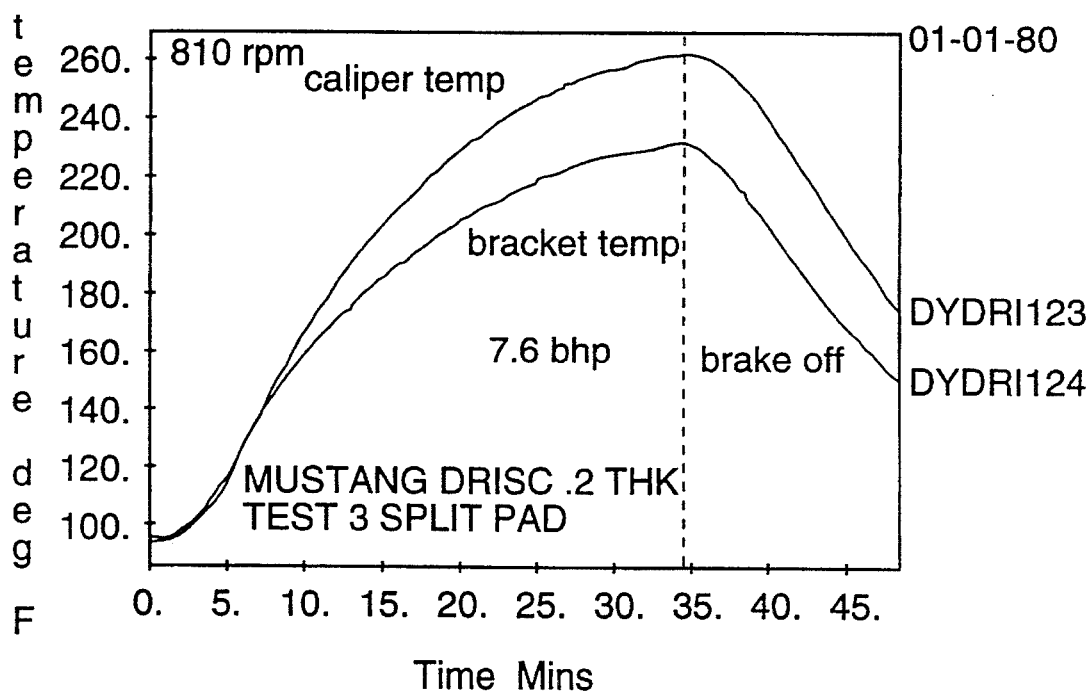
Figure 31:
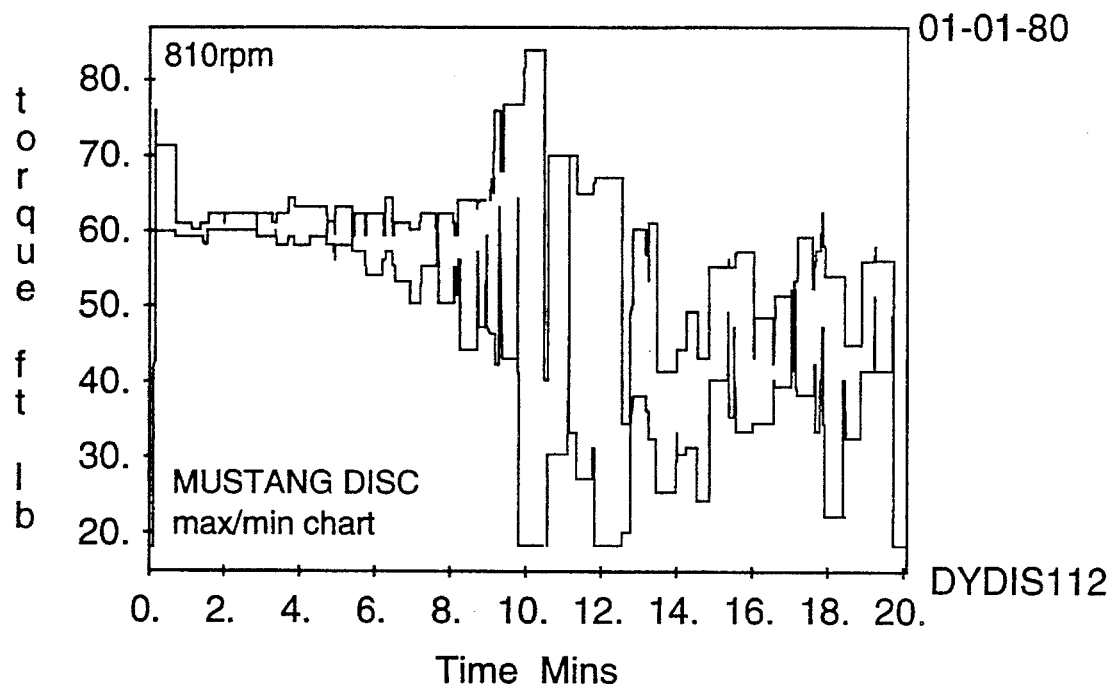
Figure 32:
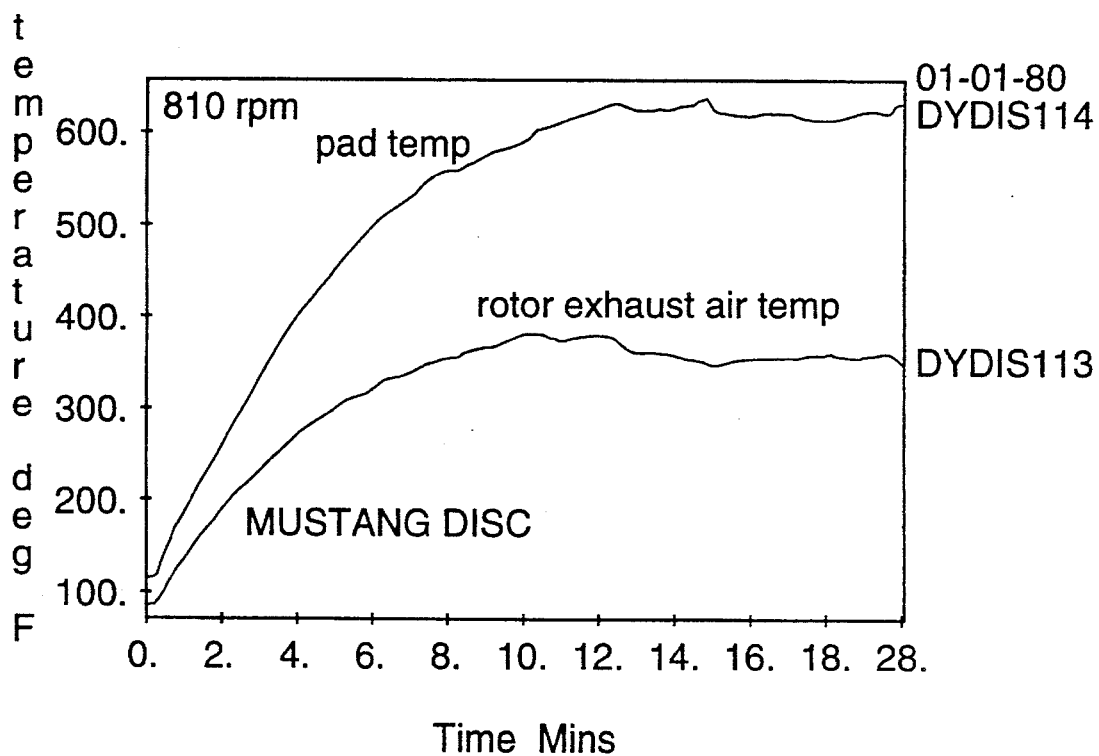
Figure 33:
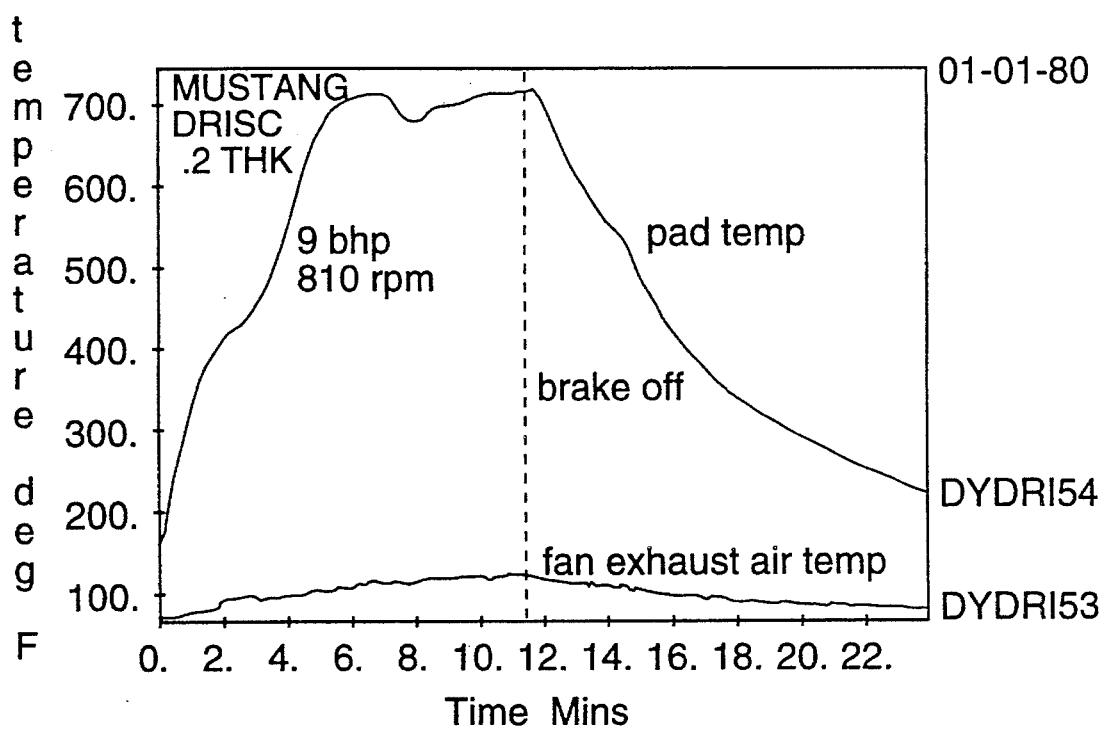
Figure 34:
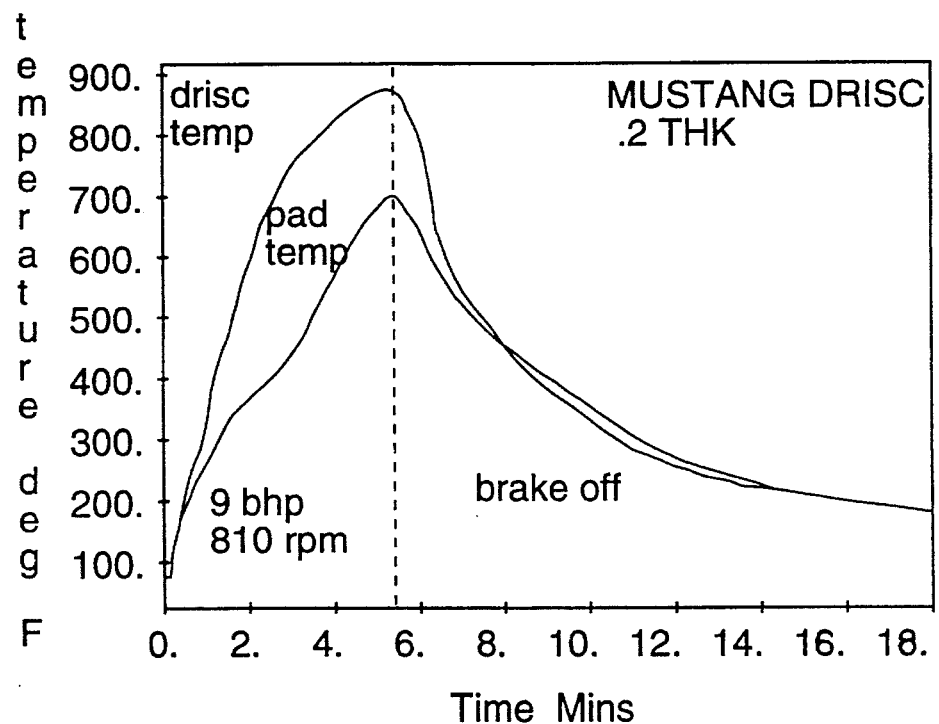

The temperature differential experienced over the ring brake member from the outer free edge to the inner edge is quite high and it was found that it was preferable to split the pad to accommodate expansion thereof (see FIG. 14). Furthermore, it was found that the pad could be split generally in the direction of rotation of the braking member into an inside pad portion 61 and an outside pad portion 63 separated by recessed portion 65. The outside pad portion is preferably made of a high temperature braking composition, as the temperatures that it is likely to experience will be higher. In contrast, the inner portion of the pad can be of a lower temperature material due to the cooling effect due to close proximity to the fan blades. The two-pad composition is particularly appropriate in that it recognizes that continuous use of the brake under high braking conditions produce high temperatures and these are best met by a high temperature material. In contrast, there are many normal operating conditions of the brake which will be at substantially reduced temperatures and a high temperature composition material, in fact, is not particularly appropriate. Often this material only works effectively when it is hot and does not produce a large braking force when the material is cold. By splitting the pad and customizing the composition in the manner described, it is possible to provide effective braking for all conditions and avoid the occurrence of substantial brake pad deterioration at high temperature regions, which would occur if a low temperature material was used throughout. In addition, this arrangement overcomes the deficiencies of a system having a high temperature material throughout, which material does not provide good braking when cold. The coefficient of friction for many brake materials changes substantially with temperature and the split pad composition allows customization of the pads for the particular application. It can be appreciated that changes can be made to the appropriate compositions that are to be used for different braking applications, for example for race cars, for commercial vehicles, for normal passenger cars, etc. It was found that with the ring brake system the split pad reduced fluctuations in the fluid pressure, measured as a function of the torque. A number of graphs show this conclusion. It was also found that this brake causes air to flow from the interior of the brake to the exterior through the center thereof and thereby continuously changes the volume of air in contact with the brake discharging the air at the exterior of the wheel. This avoids recycling of the hot air.

For many applications the low temperature pad can be effective for brake surface temperatures less than 700° F. and the high temperature pad can be effective for temperatures of 800° F. or higher.

In contrast, the disc brake causes air to be discharged at the periphery thereof, which would typically be within a wheel well, and there is a tendency for the temperature of the air in the wheel well to increase. Furthermore, it was found that the actual discharge temperature of the air was much higher for the disc brake than the ring brake. The actual disc was at a higher temperature, which would lead to this conclusion, however, the lower temperature air through the ring brake provided a larger temperature differential which can appreciably affect the rate of energy transfer.

The graphs also illustrate that the brake caliper arrangement of the ring brake effectively removed heat and this heat was transferred to the mounting bracket having the air flowing therethrough. Therefore, although the brake pads became quite hot, there was a good transfer of energy to the caliper which was able to transfer the heat energy to the mounting bracket and subsequently to the air flow. In this way, the brake was able to continuously dissipate energy and reduce the tendency of most brake systems to act as a heat sink and merely continue to rise in temperature. Basically, a number of these components reached a steady state or approximate steady state at very demanding braking applications of between 7 and 9 brake horsepower as determined in the manner discussed above. Note that the determination of the brake horsepower was the same for both systems and provided an effective manner to compare the two systems. Therefore, the measurement provides an effective relative measurement, regardless of whether the actual measurement of brake horsepower for each system may be imprecise. The charts referred to the Mustang drisk or the Mustang disc. Wherever the term "drisk" is used, this is referring to the ring brake structure.

The code for the tracks on each graph are coded. DYDRI stands for the ring brake, whereas DYDIS is for the disk system. This is followed by the session number and terminates in a single digit track number.

It was found with this test apparatus that the ring brake arrangement could provide a higher continuous braking force and was able to dissipate heat in a more effective manner to the environment. The brake arrangement is less complicated to make than the ventilated disc brake and furthermore, the brake system can be of the same weight or lighter. It was found that the prototype unit was approximately two pounds lighter than the disc brake for the high performance Mustang. Therefore, the ring brake of the present invention is easily manufactured, has the ability to provide differential braking in different brake applications, and is easily maintained.

Although preferred embodiments of the invention have been described herein in detail, it will be understood by those skilled in the art, that variations may be made thereto without departing from the spirit of the invention or the scope of the appended claims.

The embodiments of the invention in which an exclusive property or privilege is claimed are defined as follows:

1. A vehicle brake comprising a ring braking member having braking surfaces to both the interior and exterior of said member, a support arrangement securing said ring braking member for rotating about a center axis of said support arrangement, said support arrangement including a hub of a diameter less than the diameter of said ring braking member with said hub being connected to said ring braking member by intermediate radial members spaced about said hub and having air passages therebetween open to the exterior and open to a central cavity open at the interior of said brake, said radial members promoting the passage of an axial air flow through the center of said brake between the exterior and interior of the brake when said support is rotated about the center axis, a brake caliper arrangement including a brake caliper supporting and controlling opposed braking pads located to opposite sides of said ring braking member, said brake pads when actuated by movement of said brake caliper commonly braking said ring brake member, a fixed support bracket for said brake caliper located within said central cavity and across said axial air flow and of a truss structure having a large surface area generally aligned with and in contact with said axial air flow as it passes through and around said support bracket and effectively transferring heat energy from said support bracket to said axial air flow, said support bracket contacting said brake caliper to form an effective thermal transfer relationship therewith such that said support bracket acts as a heat sink for said brake caliper and indirectly acts as a heat sink for said brake pads.

2. A vehicle brake as claimed in claim 1 wherein each brake pad comprises a brake engaging surface which is divided into at least a first and second area, said first area being of a composition designed for braking at a low temperature range and said second area being of a composition designed for braking at a different temperature range higher than said low temperature range.

3. A vehicle brake as claimed in claim 2 wherein said second area is of a composition for temperatures greater than 800° F. at the braking surface.

4. A vehicle brake as claimed in claim 3 wherein said first area is of a composition particularly effective for temperatures at the braking surface of less than 700° F.

5. A vehicle brake as claimed in claim 3 wherein said first and second areas are separated by a recessed portion.

6. A brake pad as claimed in claim 2 wherein said first area is of a composition particularly effective for braking at braking surface temperatures less than 700° F. and wherein said second area is of a composition for temperatures greater than 800° F.

7. A vehicle brake as claimed in claim 1 wherein said support arrangement includes a joining ring outwardly spaced from said hub and integral with ends of said radial members which serve to connect said joining ring to said hub.

8. A vehicle brake as claimed in claim 7 wherein said joining ring cooperates with said ring braking member to provide overlapping surfaces to align said ring braking member with said support arrangement, said ring braking member being mechanically secured to said joining ring in a manner to provide effective heat conduction therebetween.

9. A vehicle brake as claimed in claim 8 wherein said ring brake member is made of steel and said support arrangement is of a cast aluminum or aluminum alloy.

10. A vehicle brake as claimed in claim 1 wherein said support bracket has an exterior surface in close proximity to the interior braking surface and shields the interior braking surface from dirt and water which can be drawn into the center of said brake by the axial air flow, said shield being opposite said interior braking surface and of a depth generally equal to the depth of the interior braking surface.

11. A vehicle brake as claimed in claim 10 wherein said radial members are designed to pump said axial air flow through said brake when said ring braking member is rotated.

12. A vehicle brake as claimed in claim 1 wherein said brake caliper bracket is designed to cause a portion of said axial air flow to pass therethrough to increase the surface area in contact with said air flow and the rate at which heat energy is transferred from said brake caliper bracket to said axial air flow when said support arrangement is rotated about said center axis.

13. A vehicle brake as claimed in claim 12 wherein said brake caliper and said brake caliper bracket are of an aluminum or aluminum alloy.

14. A vehicle brake as claimed in claim 1 wherein said bracket is designed as a truss structure having a series of ports through which the axial air flow passes as it flows through the brake from the interior to the exterior of said brake.

15. A vehicle brake as claimed in claim 14 wherein said truss is designed to cooperate with said brake caliper and the interior brake pad of the opposed brake pads to restrict contact of said axial air flow with said interior braking surface by a majority of said axial air flow flowing through the ports of said truss thereby reducing the likelihood of contaminating the interior braking surface with water or dirt that may be included in the axial air flow.

16. A vehicle brake as claimed in claim 1 wherein each brake pad has a high temperature region of a first composition for generating more brake force at high temperatures and a low temperature region of a second composition different from said first composition for generating high brake force at lower temperatures.

17. A vehicle brake as claimed in claim 1 wherein each brake pad is divided into two braking areas which are physically separated by a recessed portion.

* * * * *